(12) United States Patent
Park et al.

(10) Patent No.: US 11,732,479 B2
(45) Date of Patent: Aug. 22, 2023

(54) SLEEVE FOR CONNECTING STEEL BAR

(71) Applicants: DAE DONG M.S. LTD., Anseong-si (KR); JSPACE CO., LTD., Anseong-si (KR)

(72) Inventors: Myung Hyun Park, Yongin-si (KR); Hyun Ju Park, Yongin-si (KR)

(73) Assignees: DAE DONG M.S. LTD., Anseong-si (KR); JSPACE CO., LTD., Anseong-si (KR)

( * ) Notice: Subject to any disclaimer, the term of this patent is extended or adjusted under 35 U.S.C. 154(b) by 0 days.

(21) Appl. No.: 17/294,949

(22) PCT Filed: Oct. 31, 2019

(86) PCT No.: PCT/KR2019/014607
§ 371 (c)(1),
(2) Date: May 18, 2021

(87) PCT Pub. No.: WO2020/105897
PCT Pub. Date: May 28, 2020

(65) Prior Publication Data
US 2022/0018133 A1 Jan. 20, 2022

(30) Foreign Application Priority Data

Nov. 19, 2018 (KR) .................. 10-2018-0142388
Oct. 11, 2019 (KR) .................. 10-2019-0126064

(51) Int. Cl.
*E04C 5/16* (2006.01)
*F16B 7/04* (2006.01)

(52) U.S. Cl.
CPC .............. *E04C 5/165* (2013.01); *E04C 5/166* (2013.01); *F16B 7/04* (2013.01); *F16B 7/0406* (2013.01)

(58) Field of Classification Search
CPC .. E04C 5/165; E04C 5/166; F16B 7/04; F16B 7/046
See application file for complete search history.

(56) References Cited

U.S. PATENT DOCUMENTS

| | | | | |
|---|---|---|---|---|
| 4,666,326 A | * | 5/1987 | Hope | .................... F16B 11/008 403/265 |
| 5,366,672 A | * | 11/1994 | Albrigo | ................. B28B 23/043 264/261 |
| 5,383,740 A | * | 1/1995 | Lancelot, III | ........... E04C 5/165 403/267 |
| 5,392,582 A | * | 2/1995 | Abukawa | ................ E04C 5/165 52/848 |

(Continued)

FOREIGN PATENT DOCUMENTS

| | | |
|---|---|---|
| JP | 05-171741 A | 7/1993 |
| JP | H0-5171741 A | 7/1993 |

(Continued)

*Primary Examiner* — Adriana Figueroa
(74) *Attorney, Agent, or Firm* — Maschoff Brennan

(57) ABSTRACT

The present invention relates to a sleeve for connecting a steel bar, wherein a body prevents generation of tolerance at the circumferential surface of at least one of an upper steel bar and a lower steel bar through a tolerance generation preventing unit, the body allowing the upper steel bar to be inserted from one side thereof in an axial direction and the lower steel bar to be inserted from the other side thereof in the axial direction.

12 Claims, 23 Drawing Sheets

(56) References Cited

U.S. PATENT DOCUMENTS

| | | | | |
|---|---|---|---|---|
| 5,732,525 A | * | 3/1998 | Mochizuki | E04C 5/165 52/848 |
| 8,716,923 B2 | * | 5/2014 | Mahon | H01T 13/08 313/121 |

FOREIGN PATENT DOCUMENTS

| | | | |
|---|---|---|---|
| JP | 08-151735 A | | 6/1996 |
| JP | H0-8051735 A | | 6/1996 |
| JP | 2008-063730 A | | 3/2008 |
| JP | 2008063730 A | * | 3/2008 |
| JP | 2008-063730 A | | 1/2012 |
| JP | 2013-181278 A | | 9/2013 |
| KR | 20-0193343 B1 | | 8/2000 |
| KR | 10-1224018 B1 | | 1/2013 |
| KR | 2013-0099839 A | | 9/2013 |
| KR | 10-1465514 B1 | | 11/2014 |
| KR | 2017-0068773 A | | 6/2017 |
| KR | 10-2017-0068773 A | | 1/2018 |

\* cited by examiner

[FIG. 1]
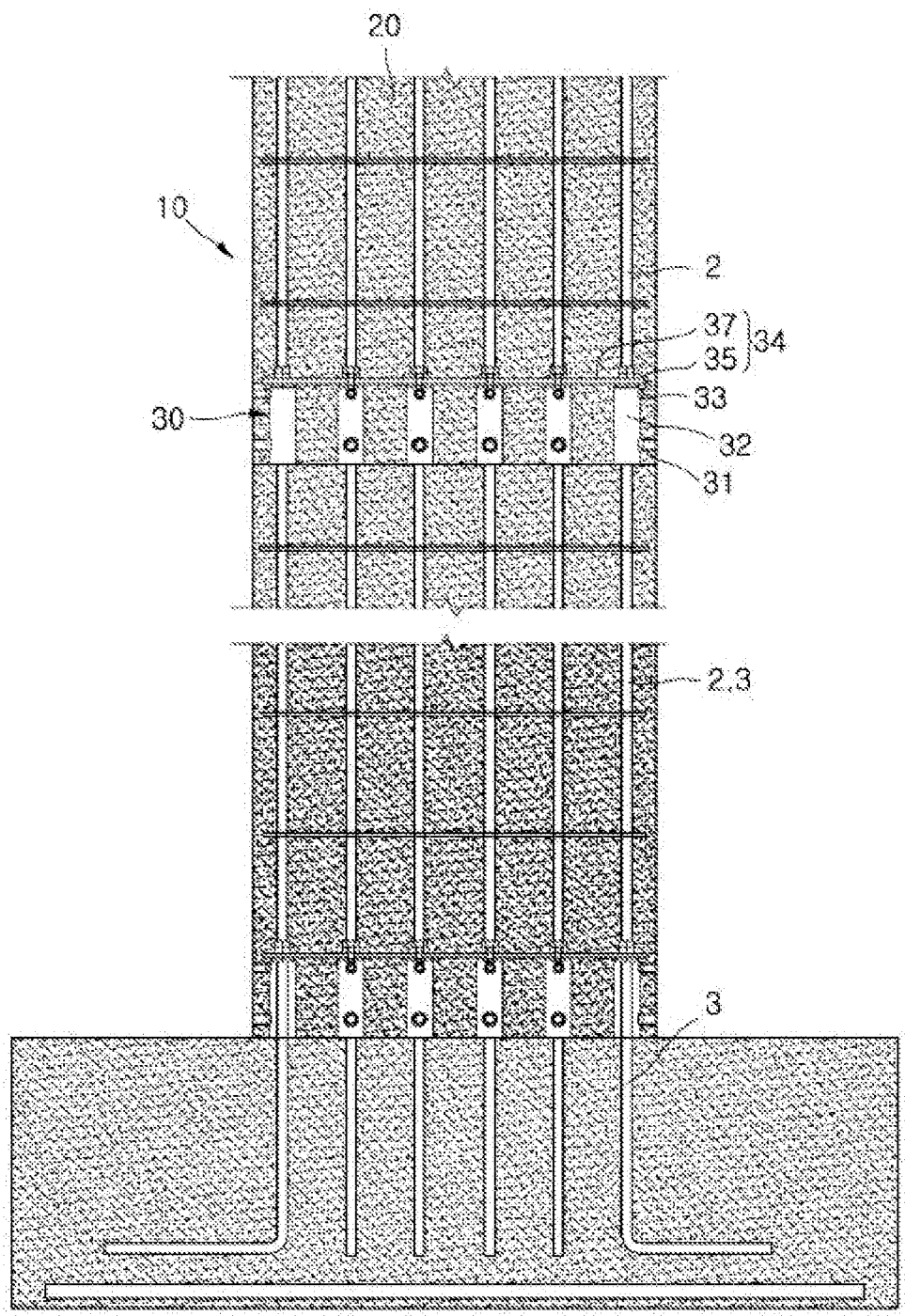

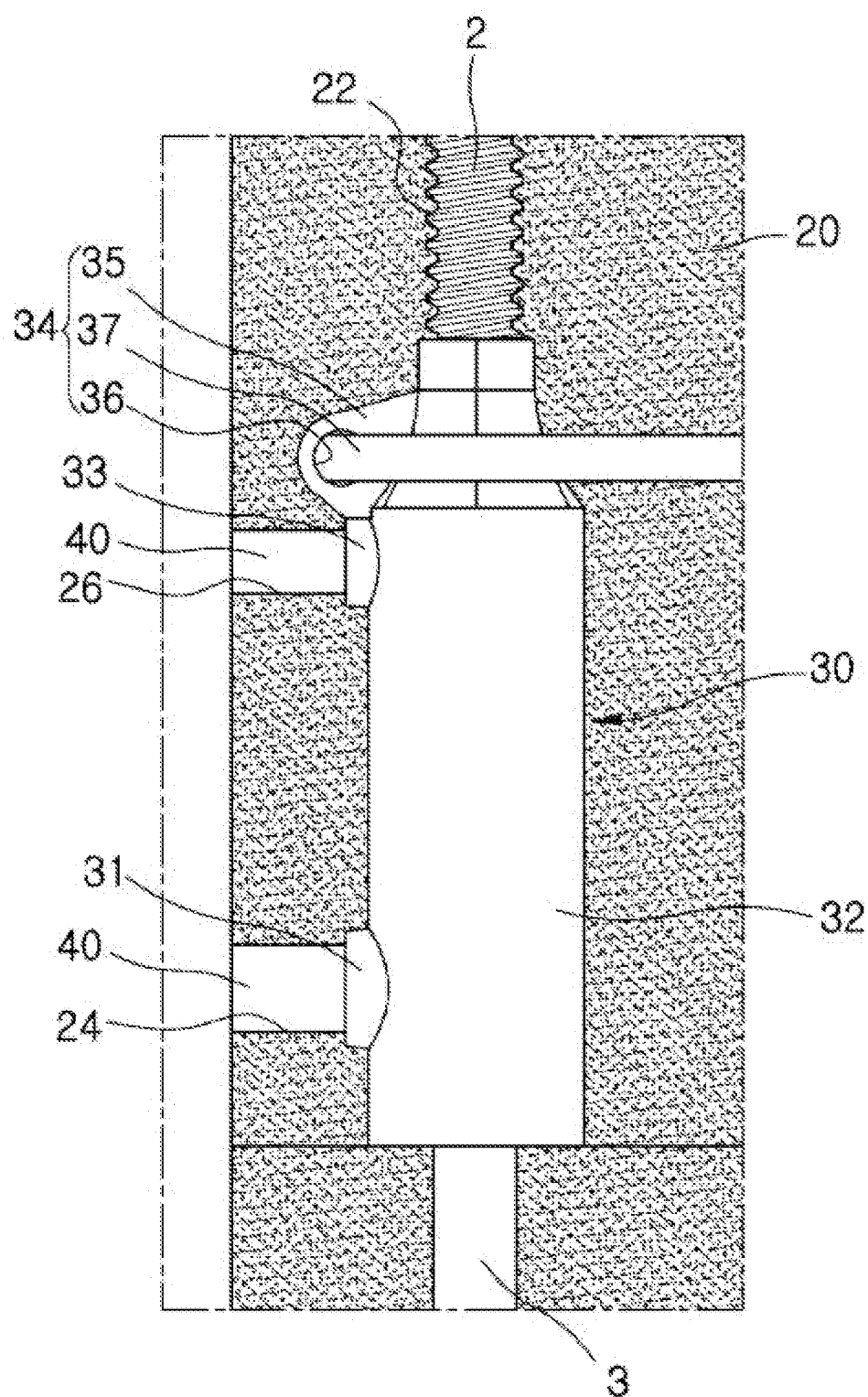
[FIG. 2]

[FIG. 3]
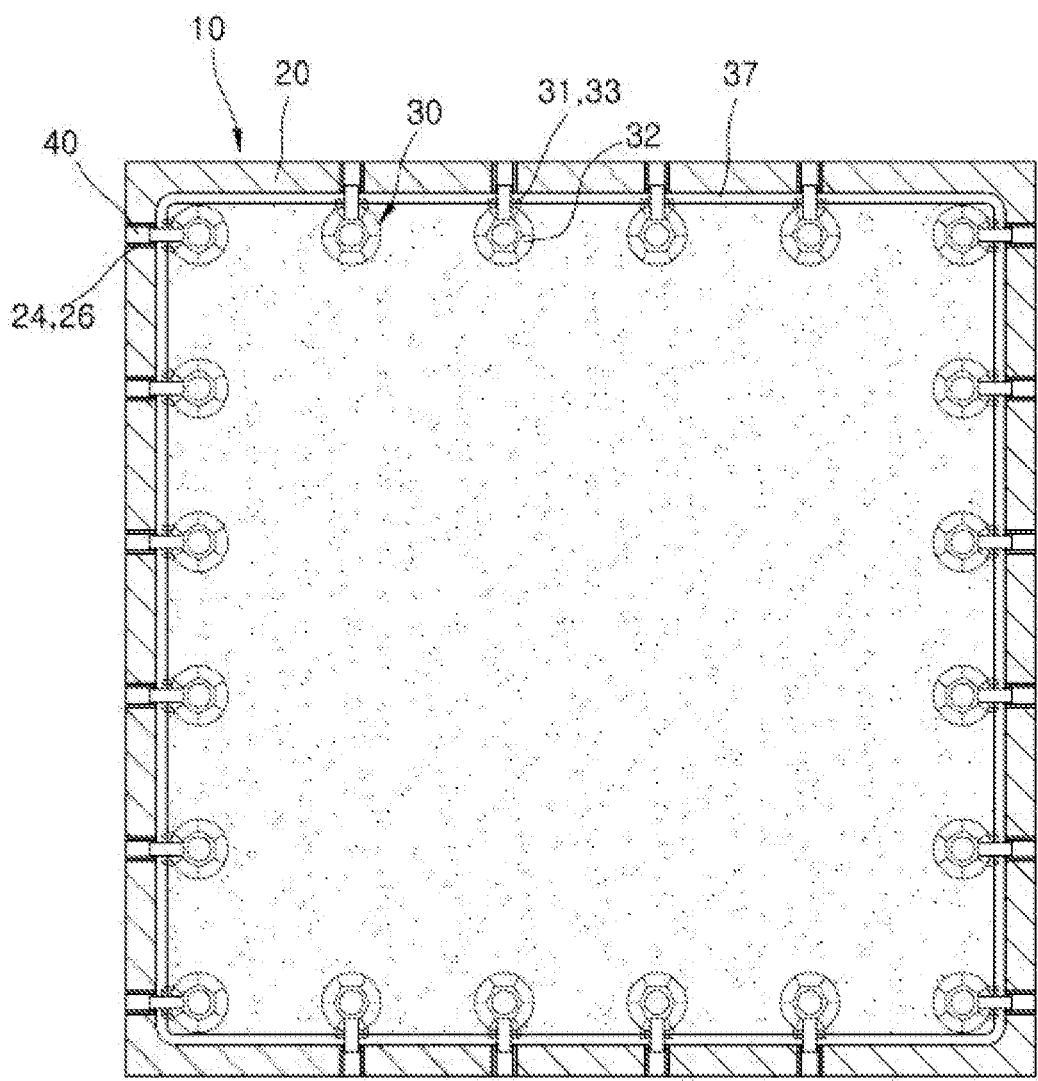

[FIG. 4]
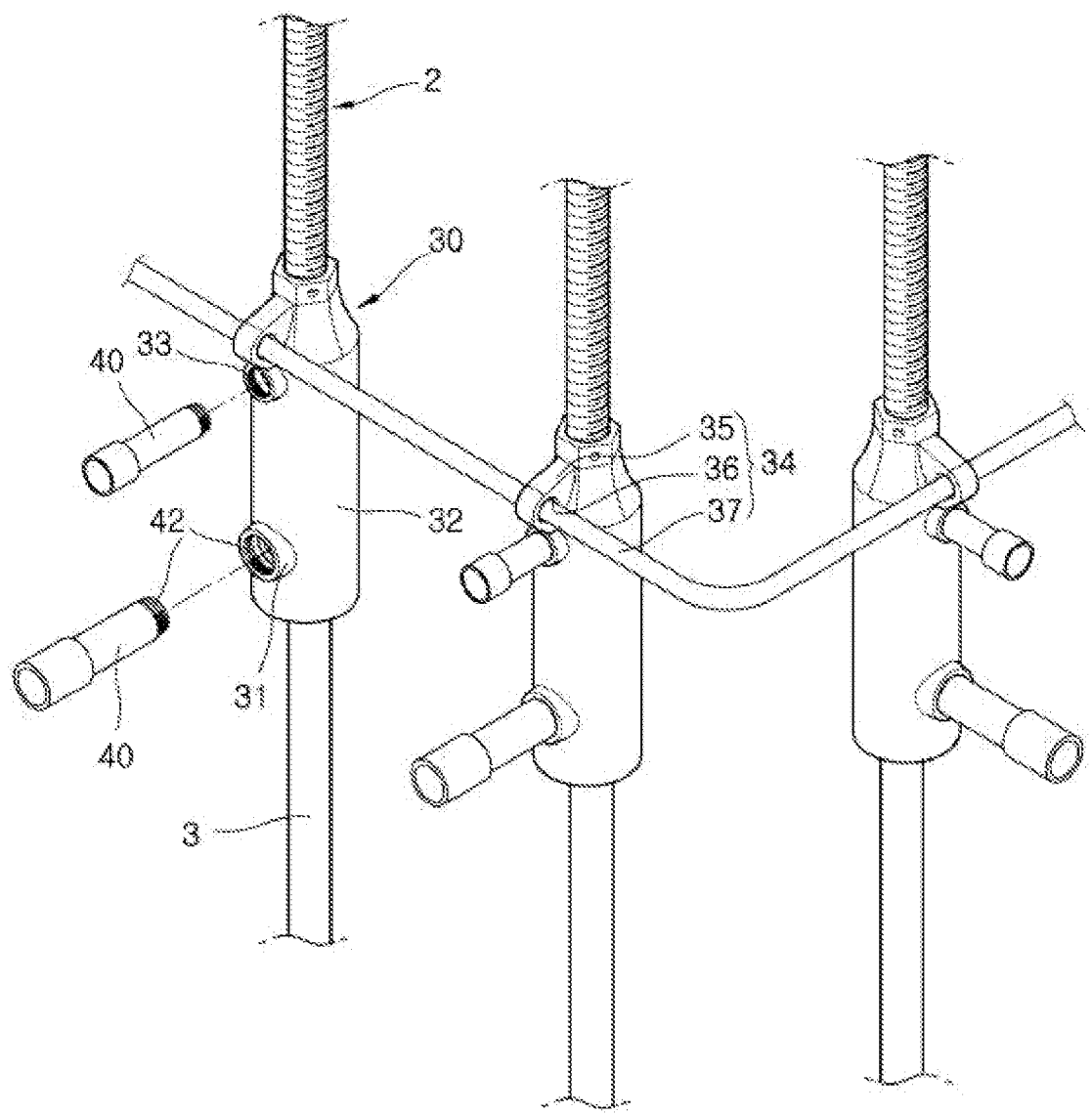

[FIG. 5]
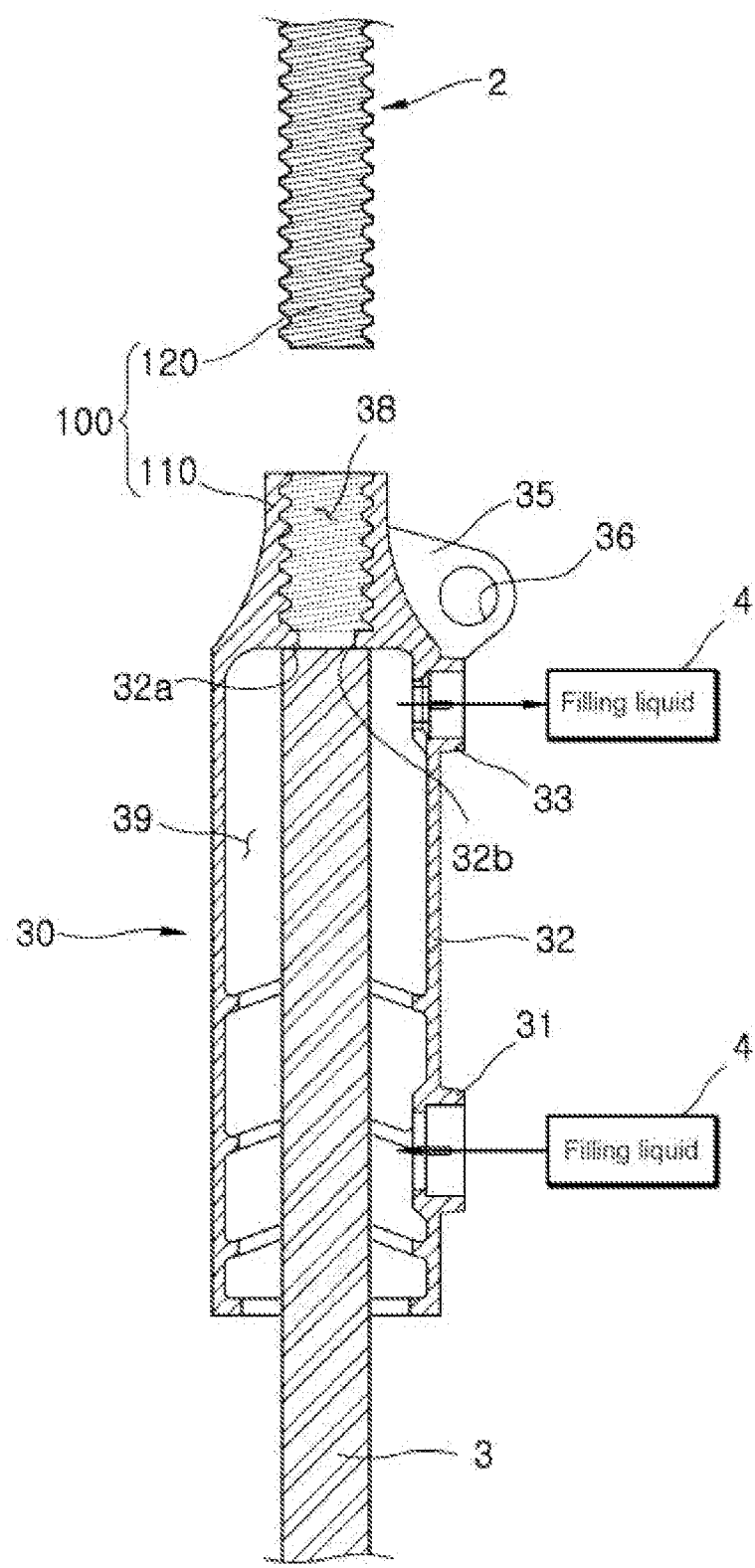

[FIG. 6]
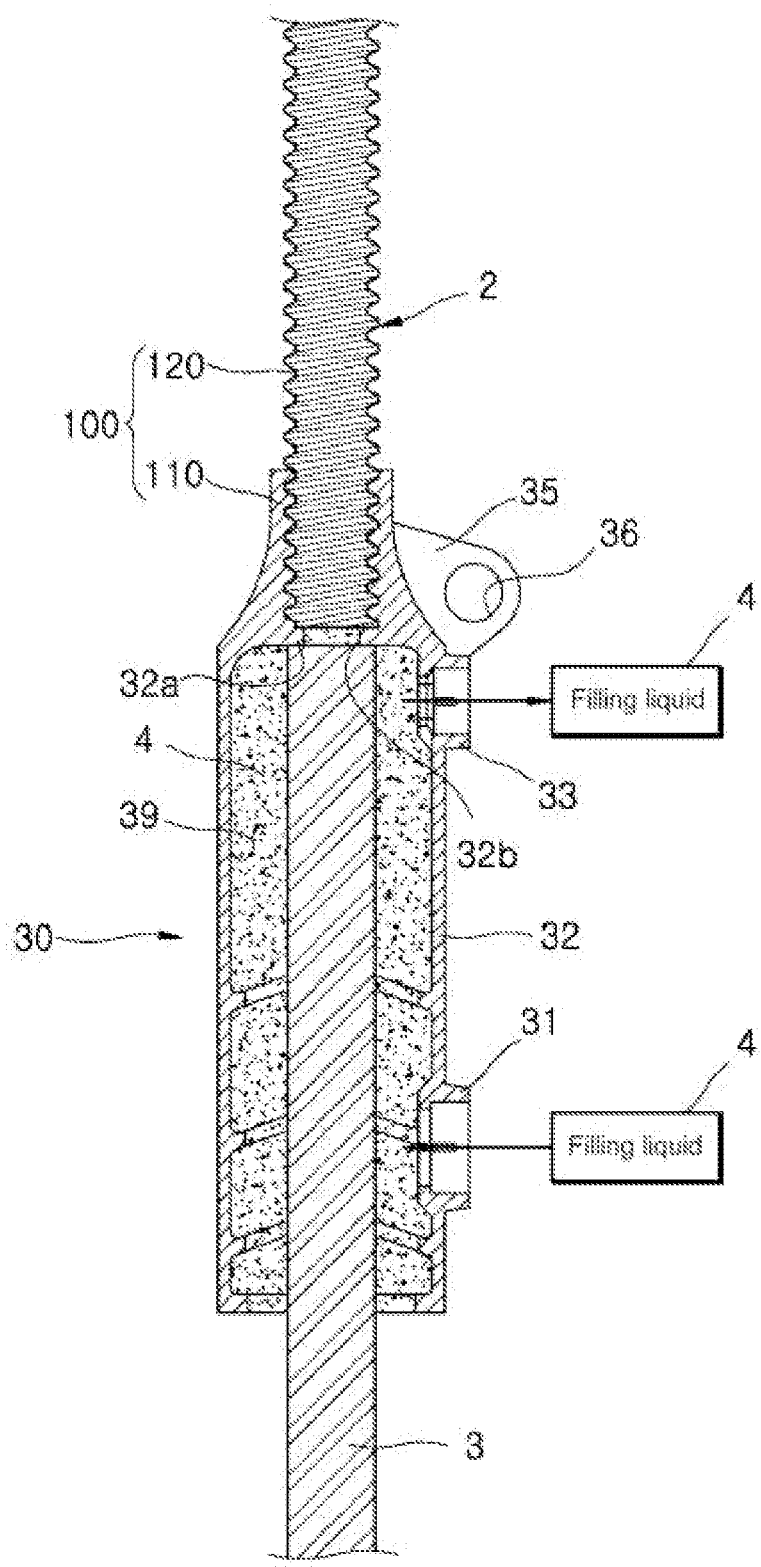

[FIG. 7]
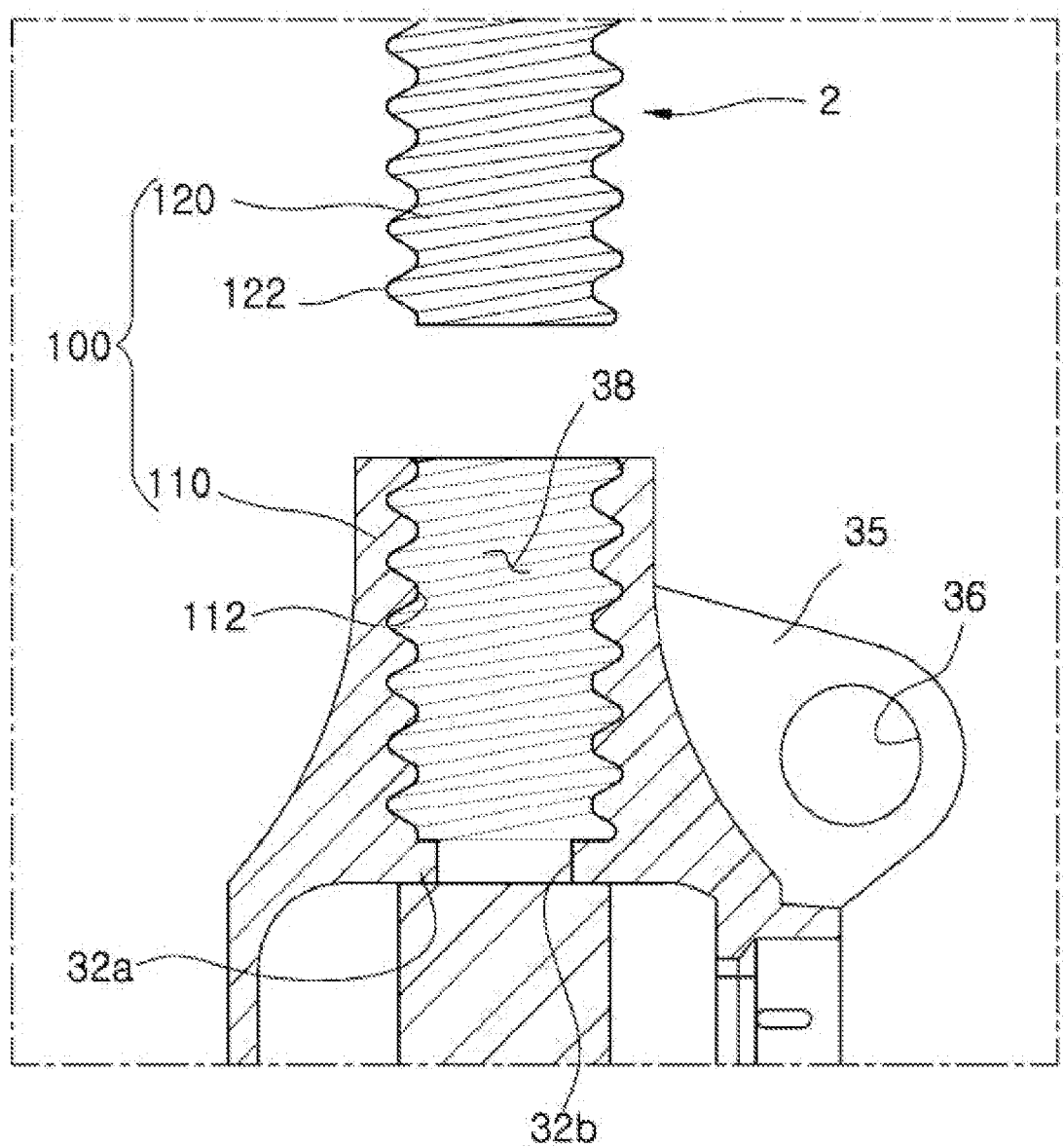

[FIG. 8]
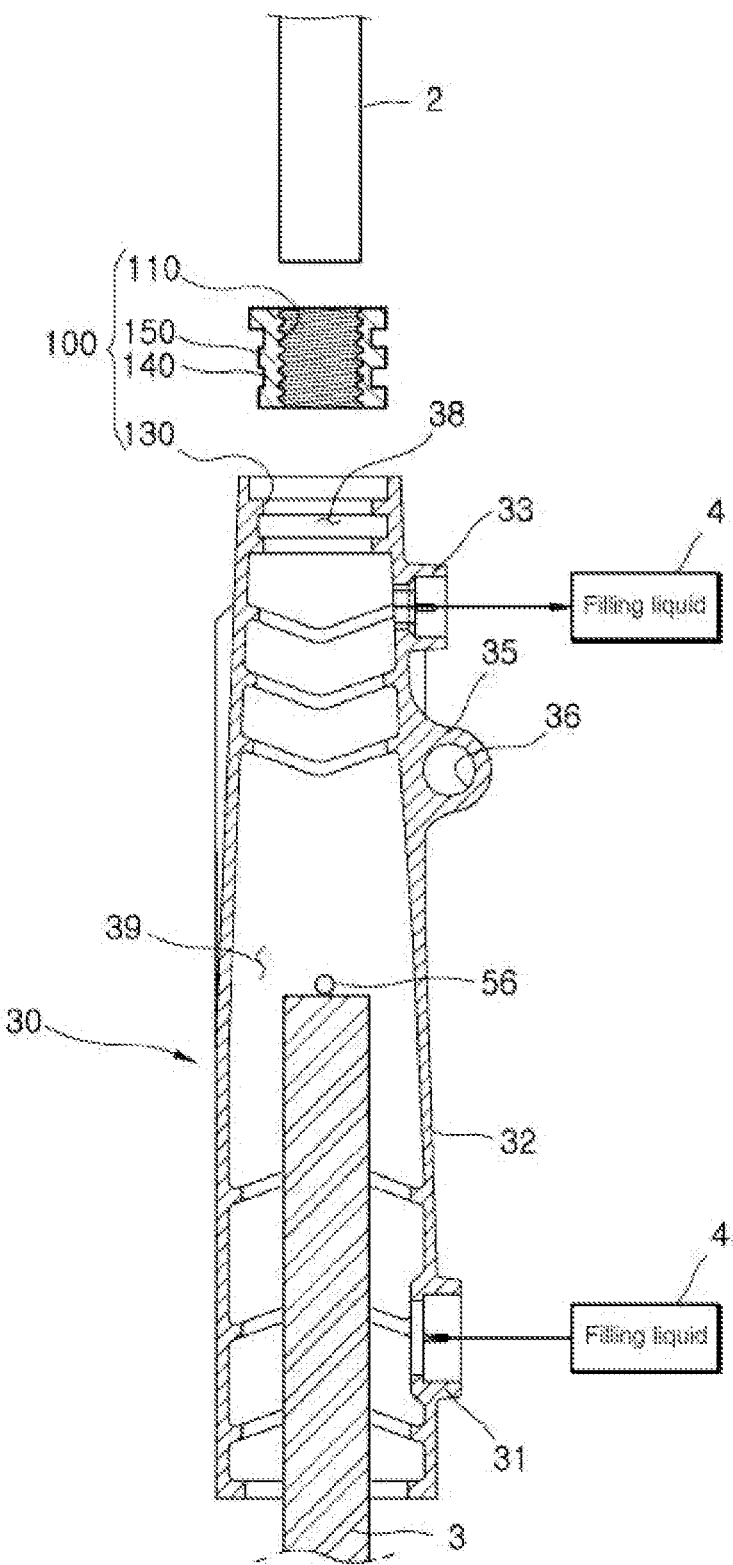

[FIG. 9]
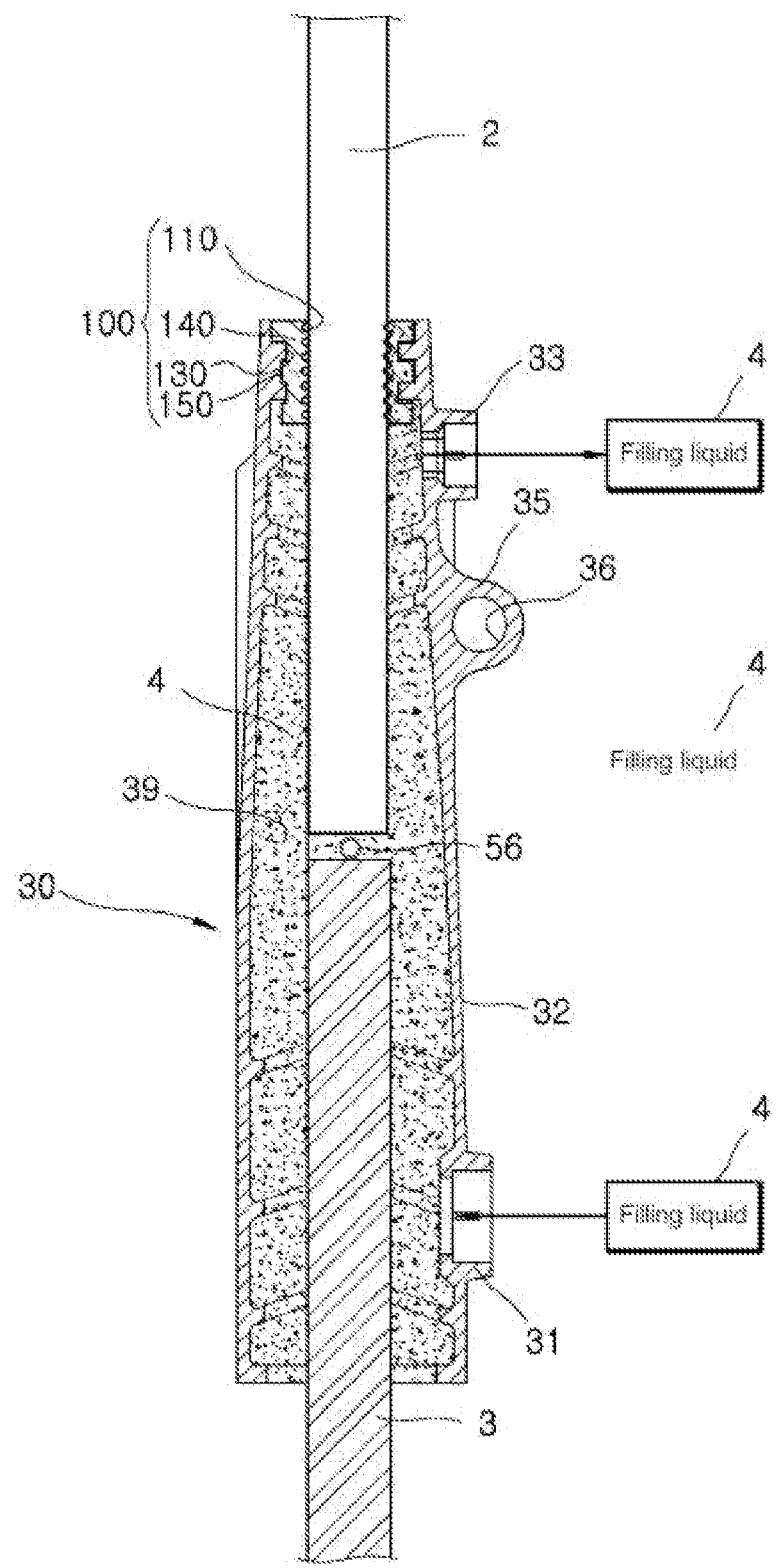

[FIG. 10]
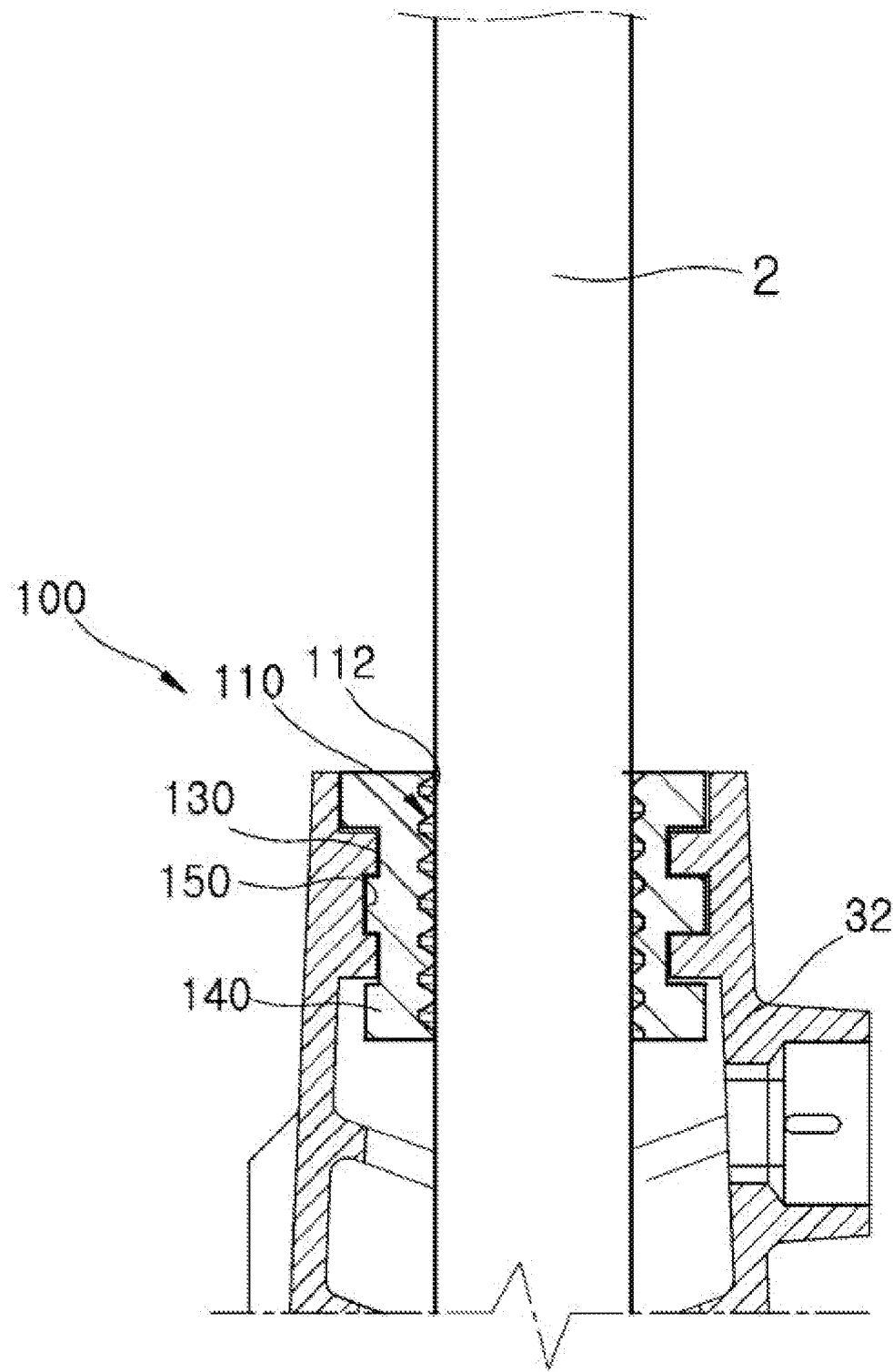

(Top)
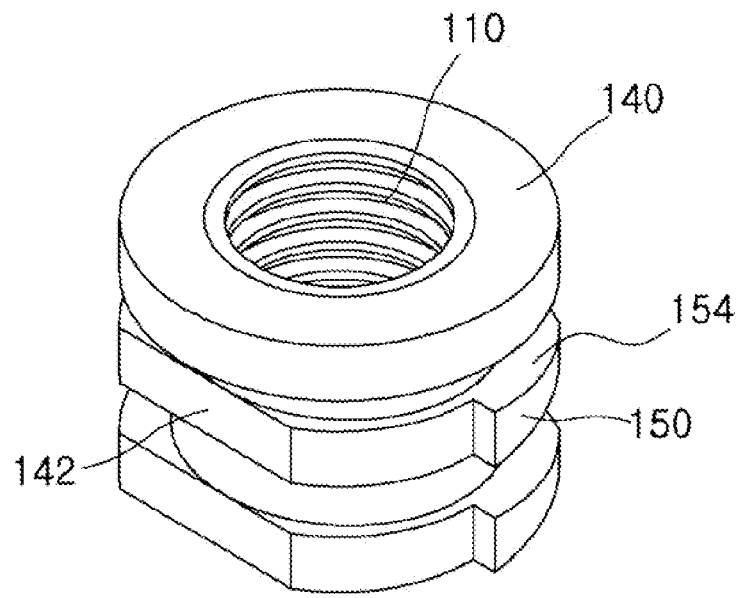
[FIG. 11A]
(Bottom)
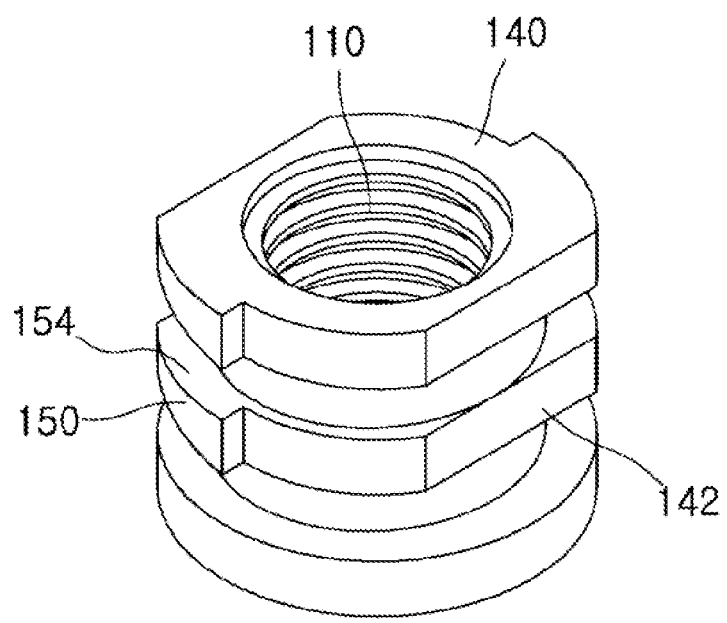
[FIG. 11B]

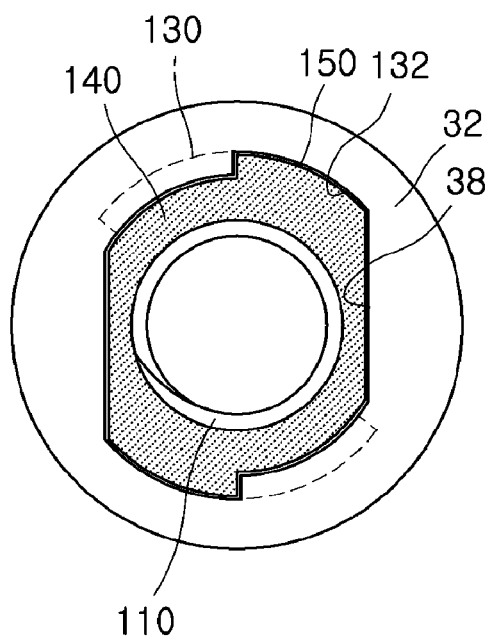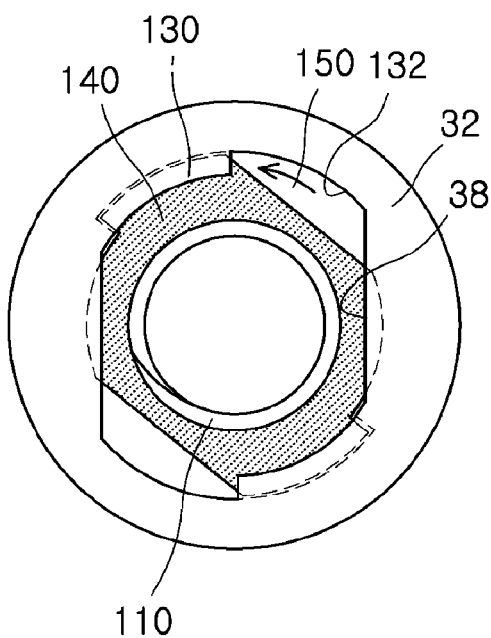
[FIG. 12A]  [FIG. 12B]

(Top)
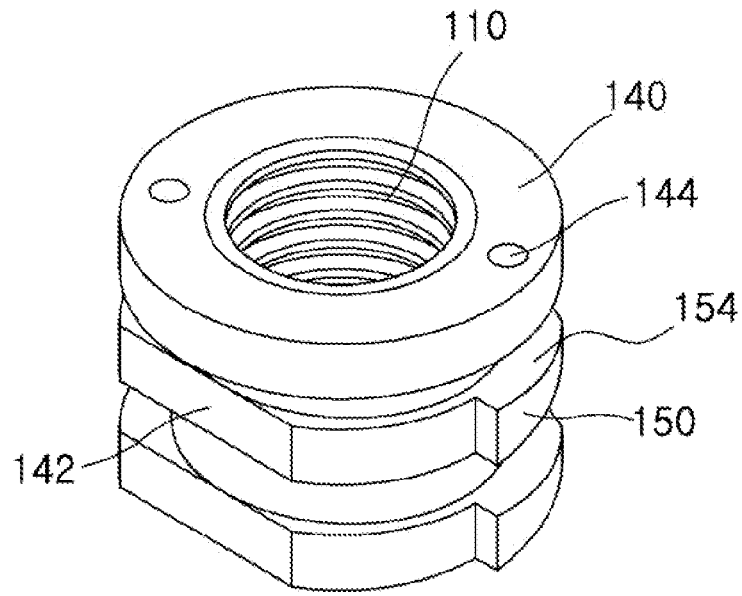
[FIG. 13A]
(Bottom)
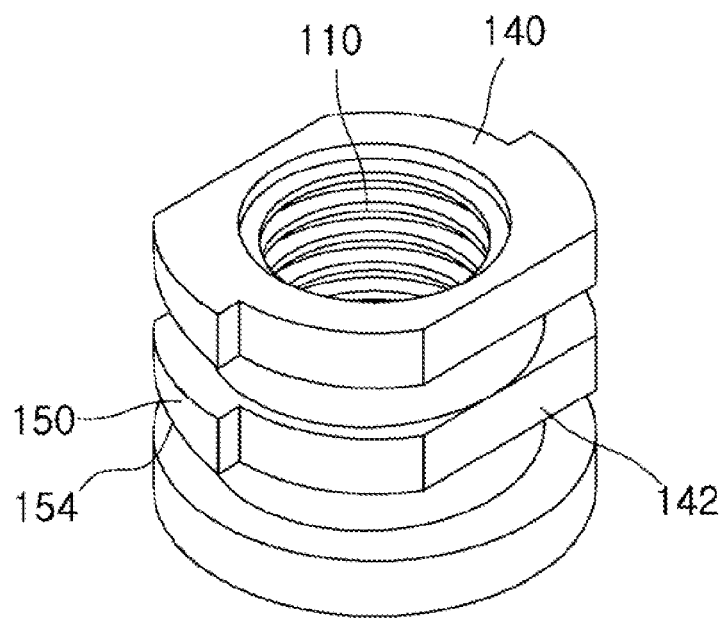
[FIG. 13B]

[FIG. 14]
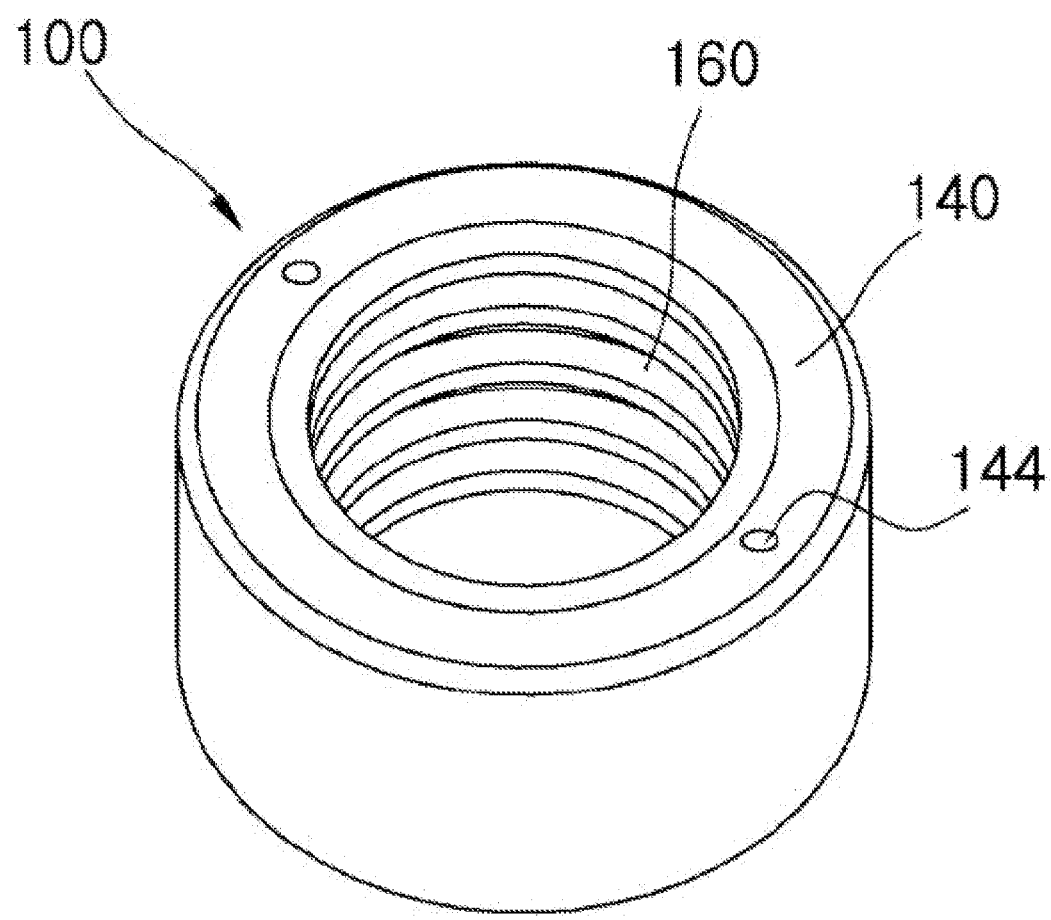

[FIG. 15]
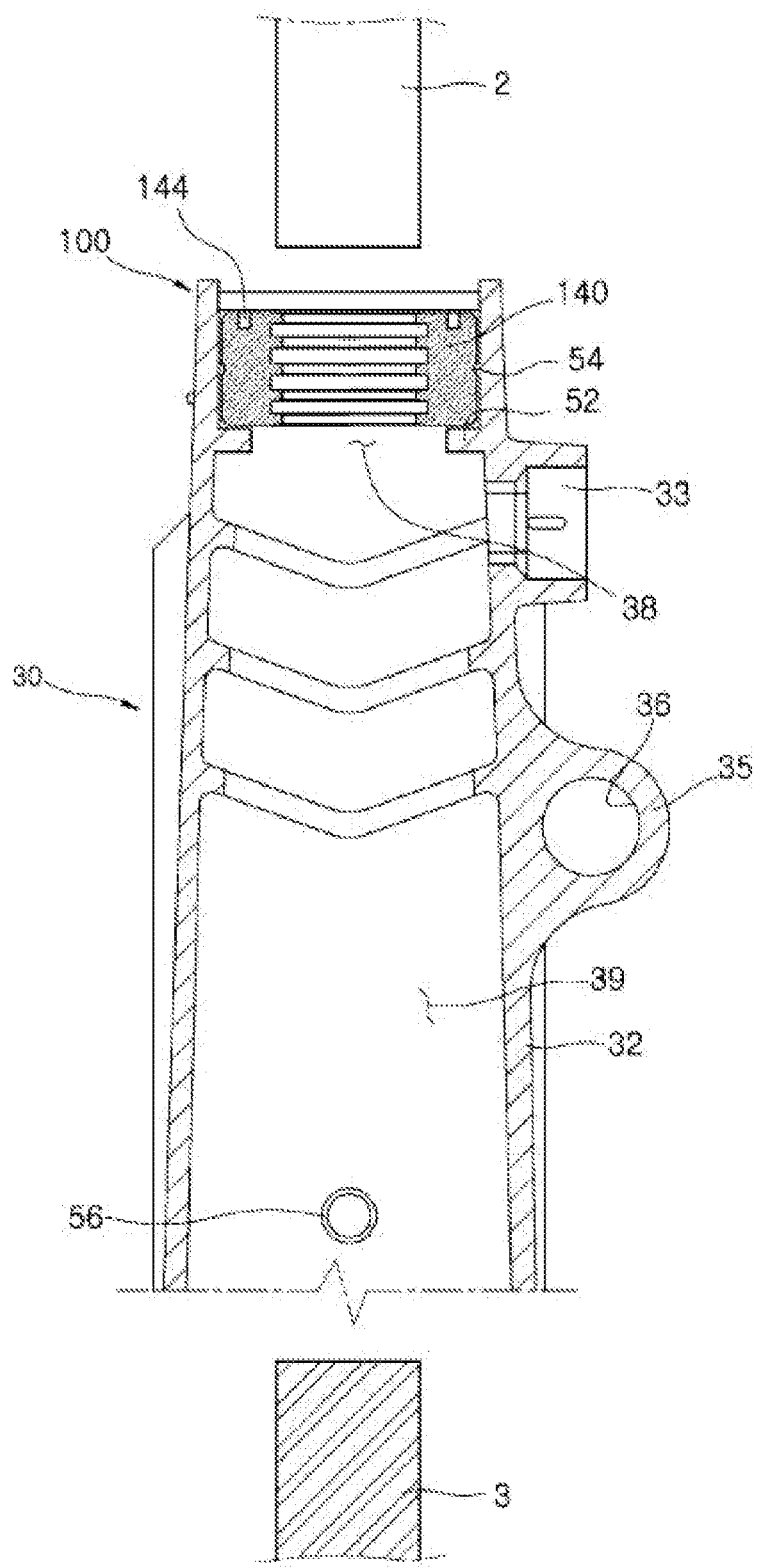

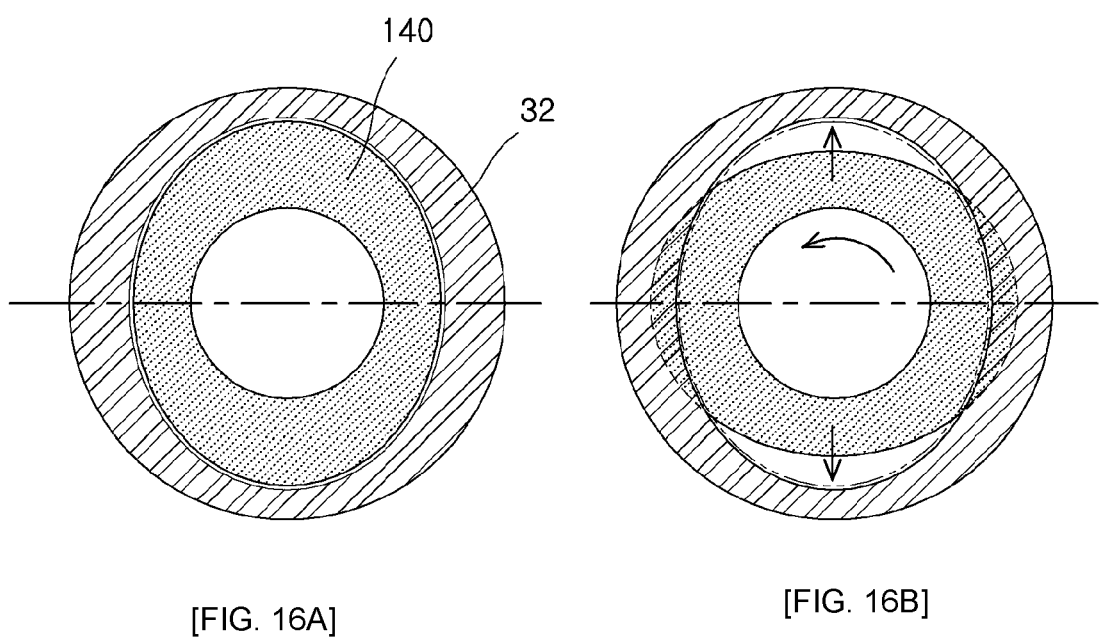
[FIG. 16A]   [FIG. 16B]

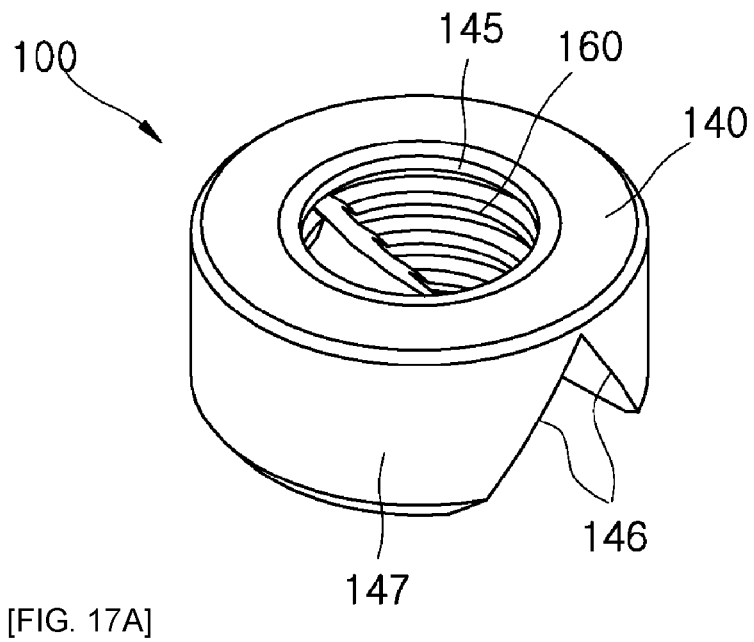
[FIG. 17A]
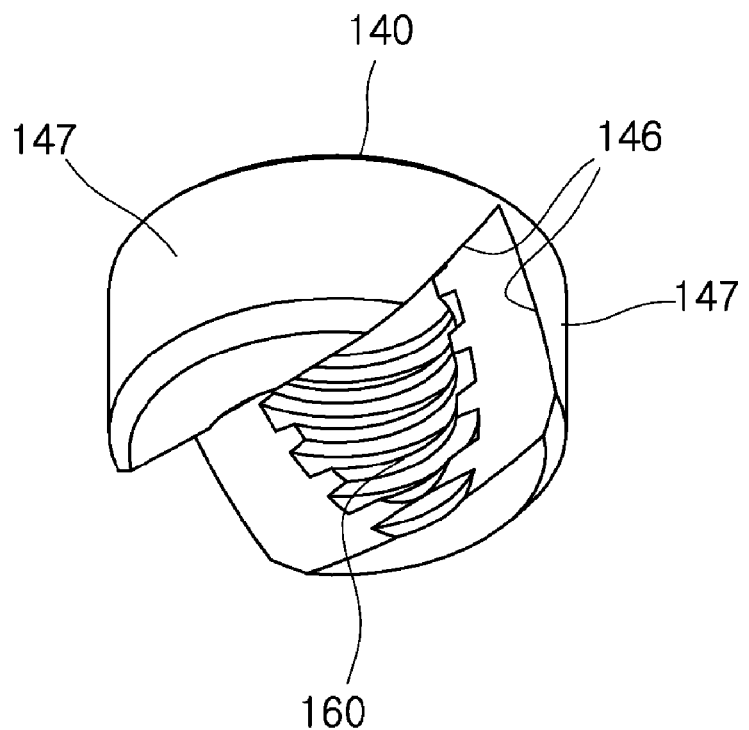
[FIG. 17B]

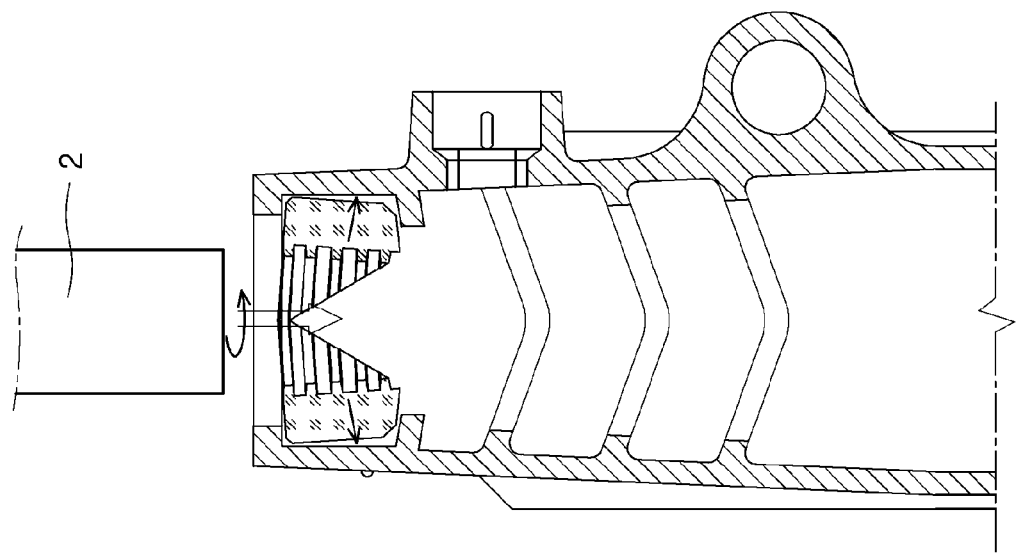
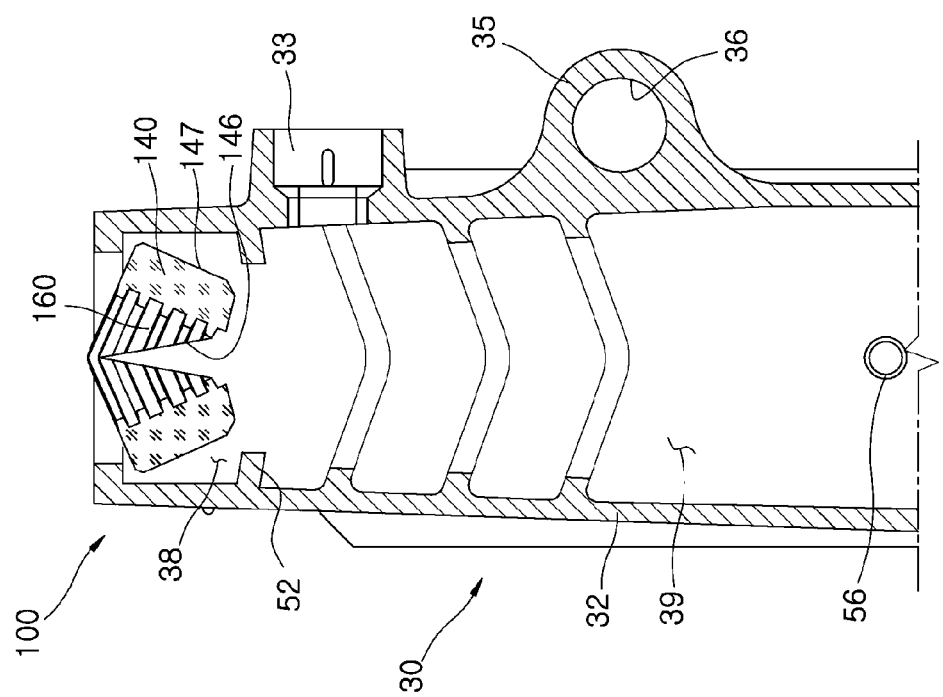

[FIG. 19]
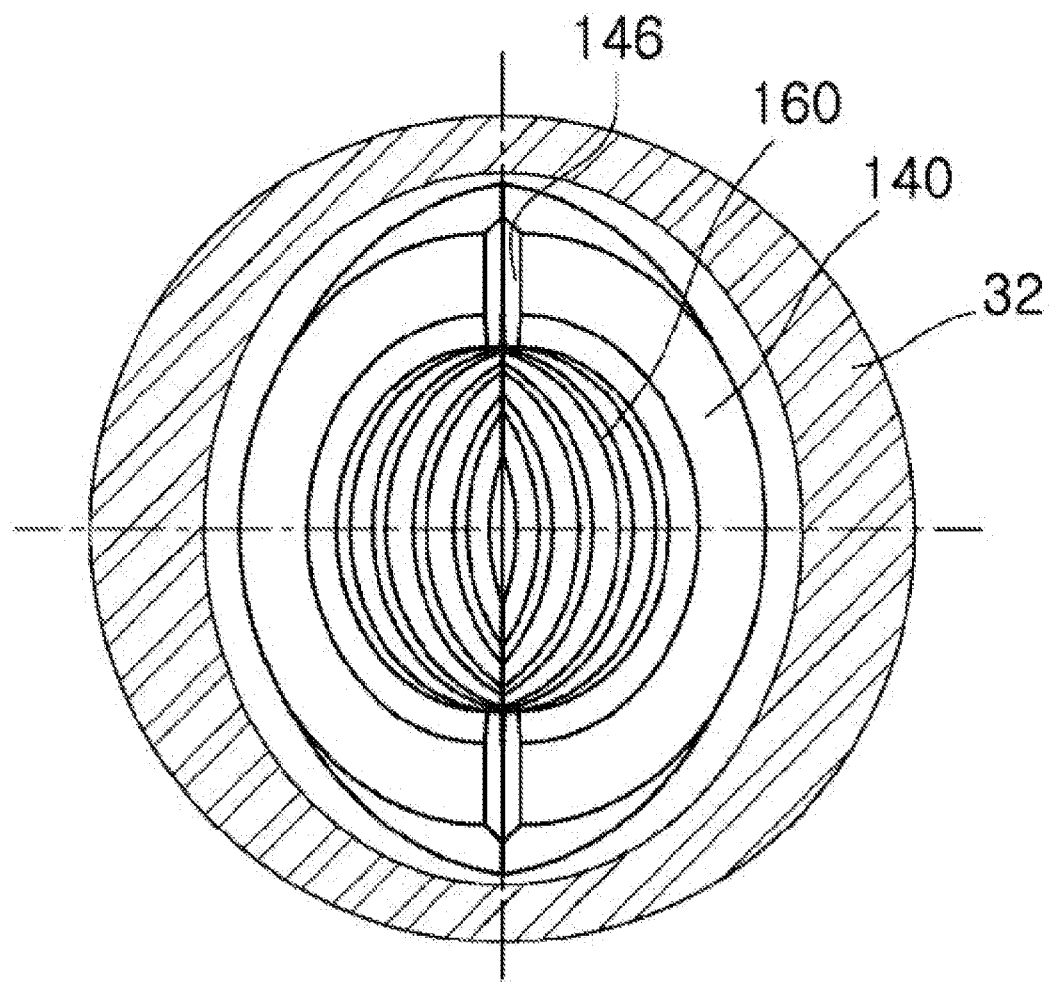

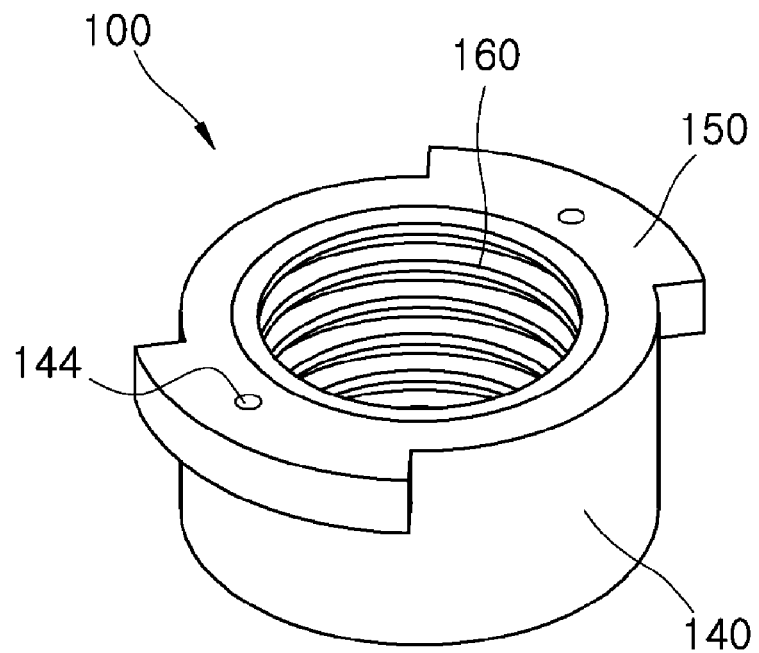
[FIG. 20A]
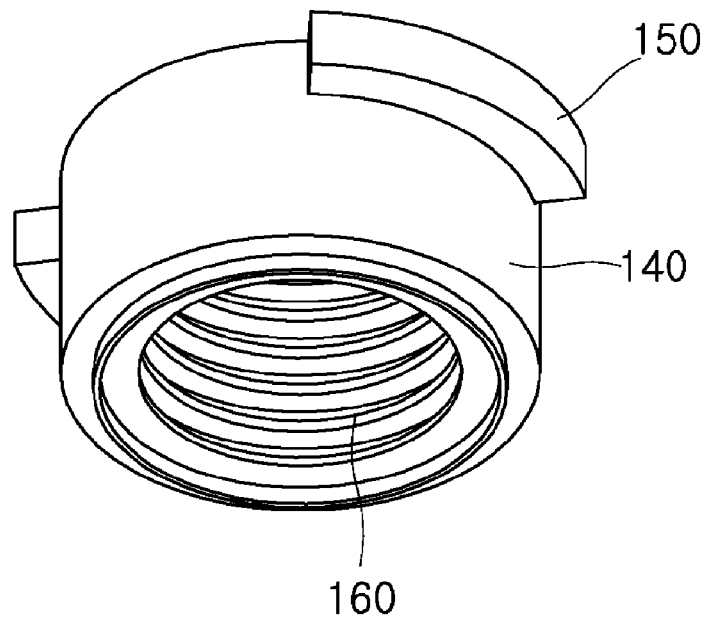
[FIG. 20B]

[FIG. 21]
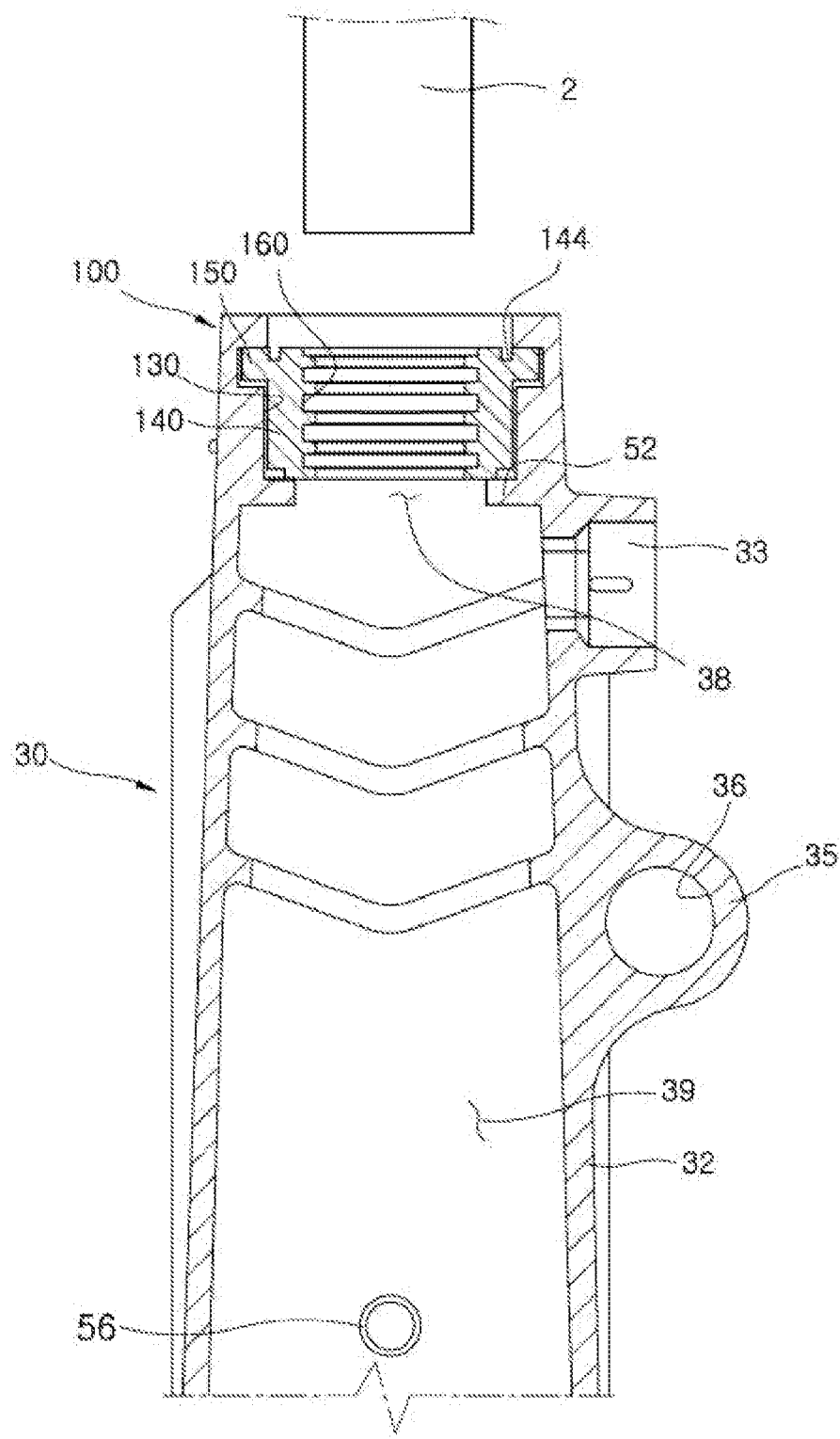

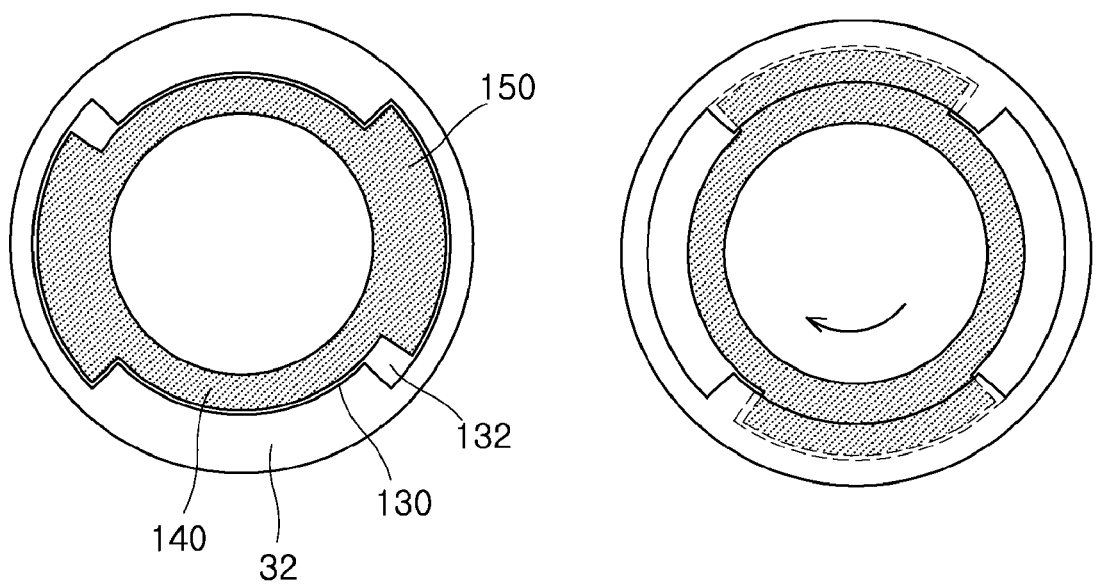
[FIG. 22A]  [FIG. 22B]

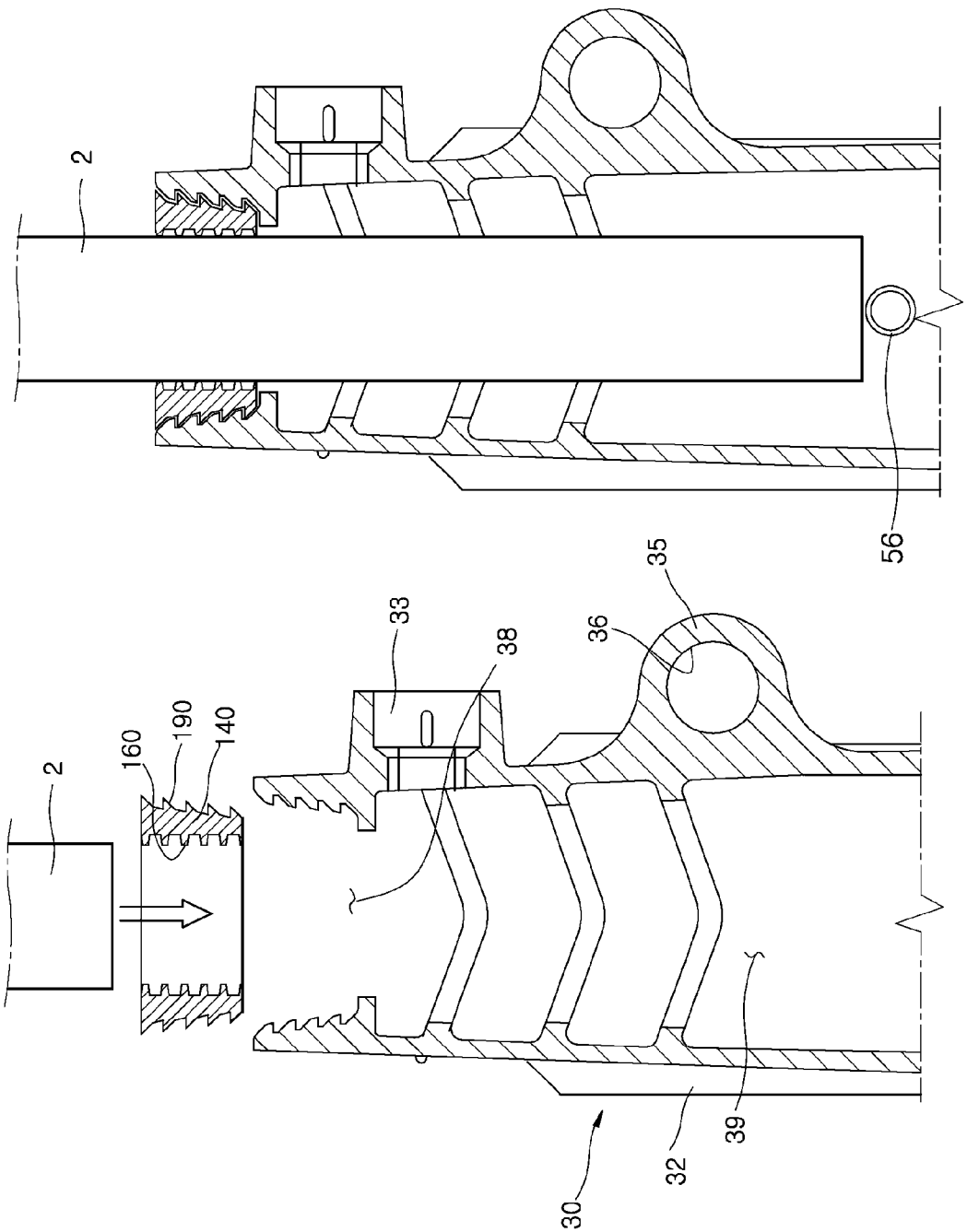

SLEEVE FOR CONNECTING STEEL BAR

TECHNICAL FIELD

The present invention relates to a sleeve for connecting a steel bar, and more particularly, to a sleeve for connecting a steel bar to reduce the amount of filling liquid filled in the body through the modification of the structure to prevent generation of tolerance between the steel bar and the inner side of the body of the sleeve to which the steel bars are connected to each other after axially inserted from the upper and lower sides of the sleeve; reduce manufacturing costs and a construction period and enhance durability of the sleeve by preventing a connection part between the steel bar and the sleeve from being damaged or broken; and further improve durability of a plug through insertion and assembly of the plug into the upper part of the body and then screw-coupling of the steel bar to the plug.

BACKGROUND ART

In general, since a grout-filled steel bar joint easily adjusts an error of a steel bar position to facilitate installation, also has good bonding property for a large-diameter steel bar widely used recently, it is a very effective as a steel bar joint in a precast process In the related art, a splice sleeve for steel bar connection has been developed to be used in a grout-filled steel bar joint scheme. A type of filling liquid, a mounting length of a steel bar in a sleeve, a sectional area size of the splice sleeve, a load applying scheme, and the like are adopted as parameters to evaluate the structural performance by the cyclic load test. As a result, it was confirmed that the splice sleeve had the structural performance equal to or higher than that of the existing one.

The sleeve for steel reinforcing connection is disclosed in Korean Utility Model Registration No. 20-0193343.

The above technical configuration is the background art for further understanding of the present invention, and does not signify the related art generally known in the field of the present invention.

DISCLOSURE

Technical Problem

According to the splice sleeves of the related art, steel bars at upper and lower sides are axially inserted therein and connected to each other, and a tolerance occurs in a space between the steel bar and the splice sleeve. Thus, in the case of impact test or the like, a connection portion between the steel bar and the splice sleeve is damaged or broken. Accordingly, the concrete column cannot be supported firmly and collapses even in a relatively low-intensity earthquake.

Thus, the above problems are required to be improved.

The present invention is provided to improve the above problems. an object of the present invention is to provide a sleeve for connecting a steel bar to reduce the amount of filling liquid filled in a body thereof through the modification into a screw coupling scheme between the body and the steel bar to prevent generation of tolerance between the steel bar and the inner side of the body of the sleeve to which the steel bars are connected to each other after axially inserted from the upper and lower sides of the sleeve; prevent a connection part between the steel bar and the sleeve from being damaged or broken; and increase coupling force between the steel bar and the body.

An object of the present invention is to provide a sleeve for connecting a steel bar to further improve durability of a plug through insertion and assembly of the plug into the upper part of the body and then screw-coupling of the steel bar to the plug.

Technical Solution

The sleeve for connecting a steel bar according to the present invention includes: a body for allowing an upper steel bar to be inserted to one side thereof in an axial direction and allowing a lower steel bar to be inserted to an opposite side in the axial direction to approach or touch the upper steel bar.

The body includes a tolerance generation preventing unit for preventing generation of tolerance between a circumferential surface of at least one of the upper steel bar and the lower steel bar.

The body includes: a first accommodation space to which the upper steel bar is axially inserted; a second accommodation space to which the lower steel bar is axially inserted; and a partition member that partitions the first accommodation space from the second accommodation space, and touches and supports ends of the axially inserted upper and lower steel bars.

The body is formed with a discharge port on a circumferential surface thereof so as to be connected to an upper portion of the second accommodation space, and formed with an injection port on the circumferential surface thereof so as to be connected to a lower portion of the second accommodation space, and adjacent bodies are bound by lock members so that each of the injection ports and the discharge ports maintain a set direction.

The lock member includes one or a plurality of ribs provided on the circumferential surface of the body 32 in the axial direction and formed with a lock hole formed there through, and a strap inserted into the lock holes positioned at the same height to simultaneously bind the bodies disposed along a predetermined trajectory so as to fix positions of the bodies.

The tolerance generation preventing unit includes: an inner threaded portion formed on an inner surface of the body; and an outer threaded portion formed on an outer circumferential surface of the upper steel bar or the lower steel bar corresponding to the inner threaded portion, and screw-coupled to the inner threaded portion to prevent a tolerance there between.

The inner threaded portion is formed with an inner curved part on each protruding mountain portion, and the outer threaded portion is formed with an outer curved part 122 on each protruding mountain portion to accommodate the corresponding inner curved portion.

The tolerance generation preventing unit includes: inner fitting protrusions spaced a part from an inner surface of an inlet side of the first accommodation space by a set interval in the axial direction of the body, and arranged discontinuously in the circumferential direction to form an inner fitting passage, such that the inner fitting passages are formed in a straight line in the axial direction of the body; a plug inserted and fixed to the inner surface of the inlet side of the first accommodation space; outer fitting protrusions formed in multiple stages on the outer surface of the plug in the axial direction, and disposed discontinuously in the circumferential direction so as to be inserted between neighboring inner fitting protrusions through corresponding inner fitting passage; and an inner threaded portion formed on an inner surface of the plug.

The outer fitting protrusion has at least one of an upper surface and a lower surface formed with an inclined surface portion that is gradually inclined so as to be forcibly inserted between the neighboring inner fitting protrusions.

The plug is formed on the circumferential surface thereof with a chamfered surface portion chamfered discontinuously in the circumferential direction, and is formed on an upper surface thereof with a recessed tool fitting groove.

The first accommodation space has an oval shape when viewed in a plan view.

The tolerance generation preventing unit includes: a plug having an oval shape so as to be inserted into the first accommodation space, inserted into the first accommodation space and rotated in the circumferential direction, thereby being elastically deformed and fitted and fixed to the body, and opened to both sides in the axial direction; and an inner concave-convex portion formed on the inner side of the plug to induce a close contact with the upper steel bar axially inserted into the plug.

The body is formed therein with a stopper protruding to support the upper steel bar axially inserted into the body through the plug.

The tolerance generation preventing unit includes: a plug in which a diameter of an insertion hole and a diameter of a circumferential surface to which the upper steel bar is forcibly inserted are formed to be reduced downward, so as to come into close contact with the inner surface of the first accommodation space when the upper steel bar is inserted into the insertion hole; outer fitting protrusions formed in multiple stages on the outer surface of the plug in the axial direction, and disposed discontinuously in the circumferential direction so as to be inserted between neighboring inner fitting protrusions through corresponding inner fitting passage; and an inner concave-convex portion formed on the inner side of the plug to induce a close contact with the upper steel bar axially inserted into the plug.

Advantageous Effects

As described above, unlike the related art, the sleeve for connecting a steel bar according to the present invention can: reduce the amount of filling liquid filled in a body thereof through the modification into a screw coupling scheme between the body and the steel bar to prevent generation of tolerance between the steel bar and the inner side of the body of the sleeve to which the steel bars are connected to each other after axially inserted from the upper and lower sides of the sleeve; reduce manufacturing costs and a construction period by preventing a connection part between the steel bar and the sleeve from being damaged or broken; and increase coupling force between the steel bar and the body.

The present invention can further improve durability of a plug through insertion and assembly of the plug into the upper part of the body and then screw-coupling of the steel bar to the plug.

DESCRIPTION OF DRAWINGS

FIG. 1 is a longitudinal sectional view of a prestressed concrete beam having a sleeve for connecting a steel bar according to the first embodiment of the present invention.

FIG. 2 is a longitudinal sectional view of enlarging a main part and showing an installation state of the sleeve for connecting the steel bar according to the first embodiment of the present invention.

FIG. 3 is a cross-sectional view of the prestressed concrete beam having the sleeve for connecting the steel bar according to the first embodiment of the present invention.

FIG. 4 is an arrangement view of the sleeve for connecting the steel bar according to the first embodiment of the present invention.

FIGS. 5 and 6 are a longitudinal sectional view of the sleeve for connecting a steel bar according to the first embodiment of the present invention.

FIG. 7 is an enlarged longitudinal sectional view of the sleeve for connecting a steel bar according to the first embodiment of the present invention.

FIGS. 8 and 9 are longitudinal sectional views of the sleeve for connecting a steel bar according to the second embodiment of the present invention.

FIG. 10 is an enlarged longitudinal sectional view of the sleeve for connecting a steel bar according to the second embodiment of the present invention.

FIG. 11 shows a perspective view and a bottom perspective view of the sleeve for connecting the steel bar according to the second embodiment of the present invention.

FIG. 12 shows plan views illustrating a state in which a plug is rotated and assembled with the sleeve for connecting the steel bar according to the second embodiment of the present invention.

FIG. 13 shows a perspective view and a bottom perspective view of the sleeve for connecting the steel bar according to the third embodiment of the present invention.

FIG. 14 is a perspective view of a sleeve for connecting a steel bar according to the fourth embodiment of the present invention.

FIG. 15 is a longitudinal sectional view of the sleeve for connecting a steel bar according to the fourth embodiment of the present invention.

FIG. 16 is a sectional plan view showing a state in which a plug is rotated and assembled with the sleeve for connecting the steel bar according to the fourth embodiment of the present invention.

FIG. 17 shows a perspective view and a bottom perspective view of the sleeve for connecting the steel bar according to the fifth embodiment of the present invention.

FIG. 18 is a longitudinal sectional view of the sleeve for connecting a steel bar according to the fifth embodiment of the present invention.

FIG. 19 is a sectional plan view showing a state in which a plug is rotated and assembled with the sleeve for connecting the steel bar according to the fifth embodiment of the present invention.

FIG. 20 shows a perspective view and a bottom perspective view of the sleeve for connecting the steel bar according to the sixth embodiment of the present invention.

FIG. 21 is a longitudinal sectional view of the sleeve for connecting a steel bar according to the sixth embodiment of the present invention.

FIG. 22 is a sectional plan view showing a state in which a plug is rotated and assembled with the sleeve for connecting the steel bar according to the sixth embodiment of the present invention.

FIG. 23 is a longitudinal sectional view of the sleeve for connecting a steel bar according to a seventh embodiment of the present invention.

BEST MODE

Mode for Invention

Hereinafter, embodiments of the sleeve for connecting a steel bar according to the present invention will be described with reference to the accompanying drawings. In the description, thicknesses of lines, sizes of components, and the like shown in the drawings may be exaggerated for clarity and convenience of the description. In addition, the terms described later are defined in consideration of functions in the present invention, and may vary according to the intention or custom of a user or operator. Therefore, the definitions of the terms will be made on the basis of contents throughout the present specification.

FIG. 1 is a longitudinal sectional view of a prestressed concrete beam having a sleeve for connecting a steel bar according to the first embodiment of the present invention. FIG. 2 is a longitudinal sectional view of enlarging a main part and showing an installation state of the sleeve for connecting the steel bar according to the first embodiment of the present invention. FIG. 3 is a cross-sectional view of the prestressed concrete beam having the sleeve for connecting the steel bar according to the first embodiment of the present invention.

FIG. 4 is an arrangement view of the sleeve for connecting the steel bar according to the first embodiment of the present invention.

FIGS. 5 and 6 are longitudinal sectional views of the sleeve for connecting a steel bar according to the first embodiment of the present invention. FIG. 7 is an enlarged longitudinal sectional view of the sleeve for connecting a steel bar according to the first embodiment of the present invention.

Referring to FIGS. 1 to 7, the sleeve 30 for connecting a steel bar according to the first embodiment of the present invention includes a body 32. The body 32 of the sleeve 30 serves to connect an upper steel bar 2 and a lower steel bar 3 installed in a concrete column 20 when a prestressed concrete beam 10 for construction is placed.

In particular, the concrete column 20 is a column manufactured by pouring concrete into a formwork (not shown), and a planar shape is determined by the formwork. In addition, insertion holes 22 are vertically formed through the concrete column 20 and arranged along a set trajectory when viewed from the top. A lower steel bar 3 fixedly installed in the bottom is inserted into a lower side of any one insertion hole 22 of the concrete column 20, and an upper steel bar 2 is inserted into an upper side of the insertion hole 22. When the concrete column 20 is poured in a state that the lower steel bar 3 and the upper steel bar 2 are installed, the insertion hole 22 may be naturally formed.

Accordingly, the upper steel bar 2 and the lower steel bar 3 are disposed in a straight line.

For convenience, the insertion holes 22 are shown as being formed along a rectangular trajectory on a plane of the concrete column 20.

Further, the bodies 32 defining an outer shape of the sleeve 30 are inserted into upper and lower portions of the insertion holes 22 of the concrete column 20, thereby serving to connect the upper steel bar 2 and the lower steel bar 3 to each other. In particular, the lowermost body 32 is buried and fixed in the concrete having a lower side installed on the floor.

Meanwhile, each of the bodies 32 includes a first accommodation space 38, a second accommodation space 39, and a partition member 32a.

The first accommodation space 38 is formed inside the body 32 to allow the upper steel bar 2 to be axially inserted thereto, and the second accommodation space 39 is formed inside the body 32 to allow the lower steel bar 3 to be axially inserted thereto.

Further, the partition member 32a serves to partition the first accommodation space 38 and the second accommodation space 39. The partition member 32a partitions the body 32 in the vertical direction, so that the amount of filling liquid 4 filled into the body 32 may be reduced.

In addition, the upper steel bar 2 and the lower steel bar 3 axially inserted into the body 32 are supported in contact with different surfaces of the partition member 32a, so that the body 32 increases supporting force for the upper steel bar 2 and the lower steel bar 3. The partition member 32a may be formed in various shapes. The upper steel bar 2 and the lower steel bar 3 come into contact with the body 32 until coming into contact with the partition member 32a, so that the partition member 32a also serves to limit the degree to which the upper steel bar 2 and the lower steel bar 3 are inserted into the body 32.

In particular, the body 32 may have various outer shapes such as a cylindrical column when viewed in a planar sectional view.

In addition, the body 32 is formed at a circumferential surface with an injection port 31 and a discharge port 33 so as to be connected to a hollow interior thereof. The injection port 31 is formed at the circumferential surface of the body 32 to correspond to the second accommodation space 39, and the discharge port 33 is formed at the circumferential surface of the body 32 to correspond to the first accommodation space 38 or the second accommodation space 39. In particular, it is assumed that the discharge port 33 is formed at the circumferential surface of the body 32 corresponding to the second accommodation space 39.

Specifically, the injection port 31 is formed at the circumferential surface of the body 32 corresponding to a lower portion of the second accommodation space 39, and the discharge port 33 is formed at the circumferential surface of the body 32 corresponding to an upper portion of the second accommodation space 39.

More specifically, when the bodies 32 are embedded in upper and lower sides of the insertion holes 22 of the concrete column 20, respectively, the injection port 31 is disposed to match a first communication hole 24, and the discharge port 33 is disposed to match a second communication hole 26.

In other words, the filling liquid 4 is filled through the first communication hole 24 and the injection port 31, and the filling liquid 4 is completely filled inside the body 32 until being discharged to the outside through the discharge port 33 and the second communication hole 26. When the filling liquid 4 is cured inside the body 32, the upper steel bar 2 and the lower steel bar 3 inserted into the body 32 in different directions are bound and fixed to the body 32. The filling liquid 4 is formed of mortar that hardens after a predetermined period of time in a fluid state. In particular, the filling liquid 4 is filled over the entire insertion hole 22 of the concrete column 20 and fixes the upper steel bar 2 and the lower steel bar 3 inserted into the insertion hole 22.

As a result, the discharge port 33 is formed at the circumferential surface of the body 32 so as to be connected to an upper inner side of the second accommodation space 39, and the injection port 31 is formed at the circumferential surface of the body 32 so as to be connected to a lower inner side of the second accommodation space 39. In other words, the injection port 31 and the discharge port 33 are connected to the second accommodation space 39 that is the same space, so that the fluid filling liquid 4 may be smoothly filled into the body 32.

Meanwhile, even after the upper steel bar 2 and the lower steel bar 3 are axially inserted into the body 32 and the filling liquid 4 is filled therein, tolerance may be generated between the inside of the body 32 and the upper steel bar 2 or the lower steel bar 3.

In order to prevent this, the body 32 includes a tolerance generation preventing unit 100 for preventing generation of tolerance between a circumferential surface of at least one of the upper steel bar 2 and the lower steel bar 3.

For convenience, it is assumed that the tolerance generation preventing unit 100 is positioned inside the first accommodation space 38 of the body 32 that accommodates the upper steel bar 2.

The tolerance generation preventing unit 100 includes an inner threaded portion 110 and an outer threaded portion 120.

The inner threaded portion 110 is formed on an inner surface of the body 32, that is, the inner surface of the first accommodation space 38, and the inner threaded portion 110 is formed on an edge circumferential surface of the upper steel bar 2 accommodated in the first accommodation space 38. Accordingly, the outer threaded portion 120 of the upper steel bar 2 is screw-coupled to into the inner threaded portion 110 of the first accommodation space 38, so that the tolerance between the first accommodation space 38 and the upper steel bar 2 rarely occurs.

Further, the outer threaded portion 120 is screw-coupled to the inner threaded portion 110, so that the upper steel bar 2 is firmly coupled and supported to the body 32.

Accordingly, the tolerance between the first accommodation space 38 and the upper steel bar 2 rarely occurs, so that inter-floor noise transmitted through the concrete column 20 may be reduced, and vulnerability on a connection portion between the steel bars 2 and 3 and the body 32 may be improved.

The outer threaded portion 120 may be formed over the entire upper steel bar 2 in the axial direction, or may be partially formed only on a circumference of one side thereof. Further, although not shown, the lower steel bar 3 may also be formed with an outer threaded portion 120 for compatibility with the upper steel bar 2.

In particular, when the filling liquid 4 is filled into a fine gap between the outer threaded portion 120 and the inner threaded portion 110 that are screw-coupled, the upper steel bar 2 is more rigidly coupled to the body 32.

To this end, the partition member 32a is formed with an open hole 32b that connects the first accommodation space 38 to the second accommodation space 39. The filling liquid 4 injected into the injection port 31 is guided and filled into the fine gap between the outer threaded portion 120 and the inner threaded portion 110 through the open hole 32b. The size and number of the open holes 32b are not limited.

In addition, the inner threaded portion 110 is formed with an inner curved part 112 on each protruding mountain portion, and the outer threaded portion 120 is formed with an outer curved part 122 on each protruding mountain portion. Accordingly, fastening force, which is applied when the upper steel bar 2 is inserted into the first accommodation space 38, may be reduced. The curvatures of the inner curved portion 112 and the outer curved portion 122 are not limited.

Meanwhile, inside the concrete column 20, adjacent bodies 32 are bound together by lock members 34 such that the injection port 31 and the discharge port 33 maintain a set direction.

The lock member 34 includes a rib 35 and a strap 37.

One or a plurality of ribs 35 are provided in the axial direction on the circumferential surface of the body 32 and formed with a lock hole 36 formed therethrough.

In addition, the strap 37 is inserted between the lock holes 36 positioned at the same height to serve to simultaneously bind the bodies 32 disposed along a predetermined trajectory, thereby fixing each position of the bodies.

Specifically, the bodies 32 are disposed on the floor along the set trajectory and covered with a formwork, and concrete is poured into the formwork, so as to manufacture the concrete column 20 in which the sleeve 30 is embedded.

All or specific body 32 is installed in a different direction while being covered with the formwork, and the injection port 31 and the discharge port 33 may not match the first communication hole 24 and the second communication hole 26 that correspond to each other, respectively.

Thus, the rib 35 is provided on an upper circumferential surface or upper and lower circumferential surfaces of the body 32. For convenience, it is assumed that the rib 35 protrudes from the upper circumferential surface of the body 32.

In addition, the rib 35 is provided at a position aligned with the injection port 31 and the discharge port 33 that protrude from the circumferential surface in the axial direction of the body 32. The rib 35, the injection port 31, and the discharge port 33 are manufactured to protrude in the same direction, so as to facilitate the manufacture of the body 32, and facilitate the storage of the body 32 compared to being manufactured to protrude in various directions. In addition, the lock hole 36 passes through the rib 35. The rib 35 may be modified in various shapes.

The strap 37 is inserted between the lock holes 36 positioned at the same height of the erected body 32 to serve to bind all of the bodies 32 disposed along the predetermined trajectory. Accordingly, the strap 37 fixes the position of the body 32 so that the injection port 31 and the discharge port 33 face the set direction. Various materials, such as a steel bar tie or a wire, may be applied as the strap 37.

Meanwhile, when the filling liquid 4 injected or discharged flows into the insertion hole 22, material costs are increased, so it is preferable that the injection port 31 and the discharge port 33 provided on the circumferential surface of the body 32 protrude from the circumferential surface of the body 32 and extend to the first communication hole 24 and the second communication hole 26, respectively. However, the body 32 formed of metal is relatively expensive. Accordingly, it is configured that connection pipes 40 extending to the first communication hole 24 and the second communication hole 26 are inserted into the injection port 31 and the discharge port 33. The connection pipe 40 is formed of plastic that is relatively inexpensive.

Further, each of the connection pipes 40 is formed with a separation preventing member 42 on a circumferential surface of a portion inserted into the corresponding injection port 31 or discharge port 33. The separation preventing member 42 serves to prevent the connection pipe 40 from being naturally separated from the injection port 31 or the discharge port 33. The connection pipe 40 may be modified in various shapes.

FIGS. 8 and 9 are longitudinal sectional views of the sleeve for connecting a steel bar according to the second embodiment of the present invention. FIG. 10 is an enlarged longitudinal sectional view of the sleeve for connecting a steel bar according to the second embodiment of the present invention. FIG. 11 shows a perspective view and a bottom perspective view of the sleeve for connecting the steel bar according to the second embodiment of the present invention.

FIG. 12 shows plan views illustrating a state in which a plug is rotated and assembled with the sleeve for connecting the steel bar according to the second embodiment of the present invention.

Referring to FIGS. 8 to 12, the sleeve 30 for connecting a steel bar according to the second embodiment of the present invention includes: a body 32, a connection pipe 40, and a tolerance generation preventing unit 100.

The body 32 and the connection pipe 40 are replaced with those described above in the first embodiment.

In addition, the tolerance generation preventing unit 100 includes: an inner fitting protrusion 130, a plug 140, an outer fitting protrusion 150, and an inner concavo-convex portion 110.

The inner fitting protrusion 130 protrudes from an inner surface of an inlet side of the first accommodation space 38. In particular, a plurality of inner fitting protrusions 130 are provided so as to be spaced apart by set intervals in the axial direction of the body 32.

Further, the inner fitting protrusions 130 are disposed discontinuously in the circumferential direction. Accordingly, inner fitting passages 132 are formed between the inner fitting protrusions 130 in the circumferential direction on the same plane.

In particular, the inner fitting passages 132 are disposed in a straight line in the axial direction of the body 32.

Accordingly, mountains and valleys are alternately formed on the inner side of the inlet side of the first accommodation space 38 in the axial direction of the body 32 by the inner fitting protrusion 130, and the inner fitting passages 132 are provided in a straight line.

The inner fitting protrusion 130 may be modified in various shapes, and the number thereof is not limited.

In addition, the plug 140 is fixed to the inner surface of the inlet side of the first accommodation space 38. The plug 140 serves to fix and support the upper steel bar 2 and may be formed of various materials such as metal or rubber. In particular, the plug 140 is formed of rubber that is elastically deformable.

Further, the plug 140 is formed in a mass ring or cylindrical shape so that the upper steel bar 2 can be inserted.

In addition, the outer fitting protrusions 150, similar to the inner fitting protrusions 130, are disposed in multiple stages on an outer circumferential surface of the plug 140 in the axial direction. Accordingly, each of the outer fitting protrusions 150 is inserted between the neighboring inner fitting protrusions 130 through the corresponding inner fitting passage 132.

The outer fitting protrusions 150 are also disposed discontinuously on the circumferential surface of the plug 140 in the circumferential direction, such that the outer fitting protrusions 150 may be moved toward the neighboring inner fitting protrusions 130 provided in the axial direction of the body 32.

Accordingly, an outer fitting passage may be formed between the outer fitting protrusions 150 disposed adjacent to each other in the circumferential direction on the same plane.

In this case, when the plug 140 is inserted into the first accommodation space 38 through the open upper side of the body 32, the outer fitting passage is disposed to correspond to the inner fitting protrusion 130, and the outer fitting protrusion 150 is disposed to correspond to the inner fitting passage 132.

Accordingly, the outer fitting protrusion 150 may be inserted between facing inner fitting protrusions 130 through the corresponding inner fitting passage 132.

Further, the inner concavo-convex portion 110 is formed on the inner surface of the plug 140.

Accordingly, the upper steel bar 2 comes into close contact with the inner concave-convex portion 110, so that the tolerance is prevented between the upper steel bar 2 and the plug 140.

In addition, the outer fitting protrusion 150 may have at least one of an upper surface and a lower surface formed with an inclined surface portion 154 that is gradually inclined so as to be forcibly inserted between the neighboring inner fitting protrusions 130.

The outer fitting protrusion 150 is gradually thickened in a direction rotated to be assembled and fixed to the body 32 due to the inclined surface portion 154.

The inclined surface portion 154 may be formed on the inner fitting protrusion 130.

In addition, the plug 140 is formed with a chamfered surface portion 142 that is chamfered discontinuously on the outer circumferential surface in the circumferential direction.

The chamfered surface portion 142 serves to reduce mutual friction force during assembly and disassembly by reducing a contact area with the inner surface of the first accommodation space 38 of the body 32.

At this point, the plug 140 is not formed with the chamfered surface portion 142 on the upper circumferential surface. Accordingly, the filling liquid 4 filled in the first accommodation space 38 is prevented from leaking toward an upper portion of the plug 140.

In particular, the plug 140 is fitted and assembled throughout the interior of the first accommodation space 38, and the lower steel bar 3 axially inserted through the second accommodation space 39 is supported in contact with a lower side of the plug 140.

The body 32 is formed therein with a stopper 56 protruding to support the upper steel bar 2 axially inserted into the body 32 through the plug 140.

The reference numerals that are not expressed are replaced with those described above in the first embodiment.

FIG. 13 shows a perspective view and a bottom perspective view of the sleeve for connecting the steel bar according to the third embodiment of the present invention.

Referring to FIGS. 8, 9, and 13, the sleeve 30 for connecting a steel bar according to the third embodiment of the present invention includes: a plug 140 inserted into the body 32.

In particular, the plug 140 is formed with a plurality of recessed tool fitting grooves 144 on an upper surface thereof.

Accordingly, a worker may insert tools (not shown) in at least two tool fitting grooves 144 and rotate the tools, so that the plug 140 may be separated from the body 32.

The reference numerals that are not expressed are replaced with those described above in the second embodiment.

FIG. 14 is a perspective view of the sleeve for connecting a steel bar according to the fourth embodiment of the present invention. FIG. 15 is a longitudinal sectional view of the sleeve for connecting a steel bar according to the fourth embodiment of the present invention. FIG. 16 is a sectional plan view showing a state in which a plug is rotated and assembled with the sleeve for connecting the steel bar according to the fourth embodiment of the present invention.

Referring to FIGS. 14 to 16, the sleeve 30 for connecting a steel bar according to the fourth embodiment of the present invention includes: a body 32 and a tolerance generation preventing unit 100.

The body 32 are replaced with those described above in the second embodiment.

Further, at least the first accommodation space 38 of the body 32 has an elliptical shape in a plan view.

In addition, the tolerance generation preventing unit 100 includes: a plug 140 and an inner concavo-convex portion 160.

The plug 140 may be formed in an oval shape so as to be inserted into at least the first accommodation space 38, may be inserted into the first accommodation space 38 and rotated in the circumferential direction, thereby being elastically deformed and fitted and fixed to the body 32, and may be formed to be open to both sides in the axial direction.

In other words, while a long axis of the plug 140 and a long axis of the first accommodation space 38 are aligned to match each other, the plug 140 is inserted into the first accommodation space 38.

In addition, the plug 140 is forcibly rotated in the circumferential direction while being elastically deformed to match the long axis substantially with a short axis of the first accommodation space 38, so that the plug 140 is forcibly fixed to the first accommodation space 38.

As being elastically deformed, the plug 140 comes into close contact with the circumferential surface of the first accommodation space 38, so that a tolerance between the plug 140 and the inner surface of the first accommodation space 38 is prevented.

The body 32 is formed with a mounting jaw 52 on the inner surface of the first accommodation space 38. The mounting jaw 52 supports the plug 140, which is fixed while being inserted into the first accommodation space 38, from the lower side, so as to serve to prevent the plug 140 from being inserted into the body 32 anymore.

In addition, the body 32 is formed with a position setting protrusion 54 protruding from the inner surface of the first accommodation space 38. The position setting protrusion 54 is formed continuously or discontinuously on the inner surface of the first accommodation space 38 in the circumferential direction, and one or more position setting protrusions are formed in the axial direction of the body 32. Accordingly, when the plug 140 is forcibly rotated inside the first accommodation space 38, the position setting protrusion 54 is inserted into the circumferential surface of the plug 140 through elastic deformation of the plug 140. Accordingly, the plug 140 is supported by the position setting protrusion 54, so that a bearing capacity for pressing force of the plug 140 acting on the mounting jaw 52 is supplemented.

The position setting protrusion 54 may be modified in various shapes.

Meanwhile, the inner concave-convex portion 160 is formed continuously or discontinuously on the inner surface of the plug 140 formed with a hole in the circumferential direction, and a plurality of inner concave-convex portions are formed in the axial direction of the plug 140.

The inner concave-convex portion 160 may be formed as a thread. The plug 140 formed of elastically deformable rubber comes into close contact with the circumferential surface of the upper steel bar 2 while coming into close contact with the inner surface of the first accommodation space 38, so that the tolerance between the inner surface of the first accommodation space 38 and the circumferential surface of the plug 140 may be prevented, and the tolerance between the inner surface of the plug 140 and the upper steel bar 2 is prevented.

In addition, the body 32 is formed therein with a stopper 56 protruding so as to support the upper steel bar 2 axially inserted into the body 32 through the plug 140. Accordingly, the upper steel bar 2 may be maintained at the position set inside the body 32. The stopper 56 may be modified in various shapes.

Further, as described in the third embodiment, the plug 140 is formed with a plurality of recessed tool fitting grooves 144 on an upper surface thereof.

The reference numerals that are not expressed are replaced with those described above in the second embodiment.

FIG. 17 shows a perspective view and a bottom perspective view of the sleeve for connecting the steel bar according to the fifth embodiment of the present invention. FIG. 18 is a longitudinal sectional view of the sleeve for connecting a steel bar according to the fifth embodiment of the present invention. FIG. 19 is a sectional plan view showing a state in which a plug is rotated and assembled with the sleeve for connecting the steel bar according to the fifth embodiment of the present invention.

Referring to FIGS. 17 to 19, the sleeve 30 for connecting a steel bar according to the fifth embodiment of the present invention includes: a body 32 and a tolerance generation preventing unit 100.

The body 32 are replaced with those described above in the second embodiment.

In addition, the tolerance generation preventing unit 100 includes: a plug 140 and an inner concavo-convex portion 160.

In the plug 140, a diameter of an insertion hole 145 and a diameter of a circumferential surface 147 to which the upper steel bar 2 is forcibly inserted are formed to be reduced downward. In addition, the circumferential surface 147 of the plug 140 is formed with one or more cutouts 146 in the circumferential direction.

Accordingly, when the upper steel bar 2 is inserted into the insertion hole 145 of the plug 140, the circumferential surface 147 is elastically deformed by the pushing force of the circumferential surface of the upper steel bar 2, thereby coming into close contact with the inner surface of the first accommodation space 38.

As being elastically deformed, the plug 140 comes into close contact with the circumferential surface of the first accommodation space 38, so that a tolerance between the plug 140 and the inner surface of the first accommodation space 38 is prevented.

The body 32 is formed with a mounting jaw 52 on the inner surface of the first accommodation space 38. The mounting jaw 52 supports the plug 140, which is fixed while being inserted into the first accommodation space 38, from the lower side, so as to serve to prevent the plug 140 from being inserted into the body 32 anymore.

Meanwhile, the inner concave-convex portion 160 is formed continuously or discontinuously on the inner surface of the plug 140 formed with the insertion hole 145 in the circumferential direction, and a plurality of inner concave-convex portions are formed in the axial direction of the plug 140.

The inner concave-convex portion 160 may be formed as a thread.

Further, at least the first accommodation space 38 of the body 32 may have an elliptical shape in a plan view.

In addition, the plug 140 may be formed in an oval shape so as to be inserted into at least the first accommodation space 38, and may be inserted into the first accommodation space 38 and rotated in the circumferential direction, thereby being elastically deformed and fitted and fixed to the body 32.

In other words, while a long axis of the plug 140 and a long axis of the first accommodation space 38 are aligned to match each other, the plug 140 is inserted into the first accommodation space 38.

In addition, the plug 140 is forcibly rotated in the circumferential direction while being elastically deformed to match the long axis substantially with a short axis of the first accommodation space 38, so that the plug 140 is forcibly fixed to the first accommodation space 38.

The plug 140 formed of elastically deformable rubber comes into close contact with the circumferential surface of the upper steel bar 2 while coming into close contact with the inner surface of the first accommodation space 38, so that the tolerance between the inner surface of the first accommodation space 38 and the circumferential surface of the plug 140 may be prevented, and the tolerance between the inner surface of the plug 140 and the upper steel bar 2 is prevented.

In addition, the body 32 is formed therein with a stopper 56 protruding so as to support the upper steel bar 2 axially inserted into the body 32 through the plug 140.

Accordingly, the upper steel bar 2 may be maintained at the position set inside the body 32. The stopper 56 may be modified in various shapes.

The reference numerals that are not expressed are replaced with those described above in the fourth embodiment.

FIG. 20 shows a perspective view and a bottom perspective view of the sleeve for connecting the steel bar according to the sixth embodiment of the present invention. FIG. 21 is a longitudinal sectional view of the sleeve for connecting a steel bar according to the sixth embodiment of the present invention. FIG. 22 is a sectional plan view showing a state in which a plug is rotated and assembled with the sleeve for connecting the steel bar according to the sixth embodiment of the present invention.

Referring to FIGS. 20 to 22, the sleeve 30 for connecting a steel bar according to the sixth embodiment of the present invention includes: a body 32 and a tolerance generation preventing unit 100.

The body 32 are replaced with those described above in the fourth embodiment.

In addition, the tolerance generation preventing unit 100 as described in the fourth embodiment, includes: an inner fitting protrusion 130, a plug 140, an outer fitting protrusion 150, and an inner concavo-convex portion 160.

The outer fitting protrusion 150 formed on the circumferential surface of the plug 140 is forcibly fitted between the inner fitting protrusions 150 formed in a pair on the inner surface of the first accommodation space 38 in the axial direction of the body 32. Accordingly, the plug 140 is fixed to the body 32.

In particular, the plug 140 is formed with a pair of outer fitting protrusions 150 in the circumferential direction in order to reduce friction when assembled on the inner surface of the body 32, and one outer fitting protrusion is formed in the axial direction.

Further, a mounting jaw 52 is formed on the inner surface of the first accommodation space 38 to support the plug 140.

The inner surface of the first accommodation space 38 is formed with an inner fitting passage 132 so as to insert the outer fitting protrusion 150 between the pair of inner fitting protrusions 130.

Meanwhile, the inner concave-convex portion 160 is formed continuously or discontinuously on the inner surface of the hole formed in the plug 140 in the circumferential direction, and a plurality of inner concave-convex portions are formed in the axial direction of the plug 140.

Further, as described in the third embodiment, the plug 140 is formed with a plurality of recessed tool fitting grooves 144 on an upper surface thereof.

The reference numerals that are not expressed are replaced with those described above in the fourth embodiment.

FIG. 23 is a longitudinal sectional view of the sleeve for connecting a steel bar according to a seventh embodiment of the present invention.

Referring to FIG. 23, the sleeve 30 for connecting a steel bar according to a seventh embodiment of the present invention includes: a body 32 and a tolerance generation preventing unit 100.

The body 32 are replaced with those described above in the second embodiment.

In addition, the tolerance generation preventing unit 100 includes: a plug 140, an inclined inner concavo-convex protrusion 180, an inclined outer concavo-convex protrusion 190, and an inner concavo-convex portion 160.

The plug 140 is inserted and fixed in the first accommodation space 38 of the body 32, and thereafter, the lower side of the upper steel bar 2 is forcibly fitted, supported and fixed. The plug 140 may be formed of various materials such as resin or rubber.

In addition, the inclined outer concave-convex protrusion 190 is formed in multiple stages on the circumferential surface of the plug 140, and formed to have an outer diameter gradually decreased downward in the axial direction of the plug 140.

Further, the inclined inner concave-convex protrusion 180 is formed in multiple stages on the inner surface of the first accommodation space 38 of the body 32 so as to correspond to the inclined outer concave-convex protrusion 190. The inclined inner concave-convex projection 180, like the inclined concave-convex protrusion 190, is formed to have a diameter decreased inward in the axial direction of the body 32.

Accordingly, the plug 140 is press-fitted into the first accommodation space 38 and fixed.

Further, a mounting jaw 52 is formed on the inner surface of the first accommodation space 38 to support the plug 140.

Meanwhile, the inner concave-convex portion 160 is formed continuously or discontinuously on the inner surface of the hole formed in the plug 140 in the circumferential direction, and a plurality of inner concave-convex portions are formed in the axial direction of the plug 140.

The reference numerals that are not expressed are replaced with those described above in the fourth embodiment.

The present invention has been described with reference to the embodiments shown in the drawings, but the descriptions are merely exemplary illustrations and it will be understood by those skilled in the art that various deformations, modifications and other equivalent embodiments may be applicable based on the above-described embodiments. Therefore, the actual scope of the present invention will be defined by the appended claims and their equivalents.

The invention claimed is:

1. A sleeve for connecting a steel bar, the sleeve comprising:
a body for allowing an upper steel bar to be inserted to one side thereof in an axial direction and allowing a lower steel bar to be inserted to an opposite side in the axial direction to approach or touch the upper steel bar, wherein:
the body includes a tolerance generation preventing unit for preventing generation of tolerance between a circumferential surface of at least one of the upper steel bar and the lower steel bar,
the body includes a first accommodation space to which the upper steel bar is axially inserted, a second accommodation space to which the lower steel bar is axially inserted,
the body is formed with a discharge port on a circumferential surface thereof so as to be connected to an upper portion of the second accommodation space, and formed with an injection port on the circumferential surface thereof so as to be connected to a lower portion of the second accommodation space,
the tolerance generation preventing unit includes a plug inserted and fixed to an inner surface of an inlet side of the first accommodation space, and formed of an elastically deformable material, and outer fitting protrusions formed in multiple stages on an outer surface of the plug in the axial direction and disposed discontinuously in a circumferential direction so as to be inserted between neighboring inner fitting protrusions through corresponding inner fitting passage, and
the plug is formed on a circumferential surface of the plug with a chamfered surface portion chamfered discontinuously in a circumferential direction without being formed with the chamfered surface portion on an upper circumferential surface of the plug.

2. The sleeve of claim 1, wherein the body includes:
a partition member that partitions the first accommodation space from the second accommodation space, and touches and supports ends of the axially inserted upper and lower steel bars.

3. The sleeve of claim 1, wherein the tolerance generation preventing unit includes:
an inner threaded portion formed on an inner surface of the body; and an outer threaded portion formed on an outer circumferential surface of the upper steel bar or the lower steel bar corresponding to the inner threaded portion, and screw-coupled to the inner threaded portion to prevent a tolerance therebetween.

4. The sleeve of claim 1, wherein
adjacent said bodies are bound by lock members so that each of the injection ports and the discharge ports maintain a set direction.

5. The sleeve of claim 1, wherein the tolerance generation preventing unit includes:
inner fitting protrusions spaced apart from the inner surface of the inlet side of the first accommodation space by a set interval in the axial direction of the body, and arranged discontinuously in the circumferential direction to form an inner fitting passage, such that the inner fitting passages are formed in a straight line in the axial direction of the body; and an inner threaded portion formed on the inner side of the plug to pressurize a circumferential surface of the axially inserted upper or lower steel bars.

6. The sleeve of claim 1, wherein the outer fitting protrusion has at least one of an upper surface and a lower surface formed with an inclined surface portion that is gradually inclined so as to be forcibly inserted between the neighboring inner fitting protrusions.

7. The sleeve of claim 1, wherein the plug is formed on an upper surface thereof with a recessed tool fitting groove.

8. The sleeve of claim 1, wherein the first accommodation space has an oval shape when viewed in a plan view,
wherein the plug has an oval shape so as to be inserted into the first accommodation space, inserted into the first accommodation space and rotated in the circumferential direction, thereby being elastically deformed and fitted and fixed to the body, and opened to both sides in the axial direction.

9. The sleeve of claim 1, wherein the plug has a diameter of an insertion hole and a diameter of a circumferential surface to which the upper steel bar is forcibly inserted are formed to be reduced downward, so as to come into close contact with the inner surface of the first accommodation space when the upper steel bar is inserted into the insertion hole.

10. The sleeve of claim 5, wherein the body is formed therein with a stopper protruding to support the upper steel bar axially inserted into the body through the plug.

11. The sleeve of claim 8, wherein the body is formed therein with a stopper protruding to support the upper steel bar axially inserted into the body through the plug.

12. The sleeve of claim 9, wherein the body is formed therein with a stopper protruding to support the upper steel bar axially inserted into the body through the plug.

* * * * *